(12) United States Patent
Park et al.

(10) Patent No.: US 11,005,353 B2
(45) Date of Patent: May 11, 2021

(54) LENS MOVING APPARATUS AND CAMERA MODULE INCLUDING SAME

(71) Applicant: LG INNOTEK CO., LTD., Seoul (KR)

(72) Inventors: Sang Ok Park, Seoul (KR); Kyoung Ho Yoo, Seoul (KR); Sung Guk Lee, Seoul (KR); Seong Min Lee, Seoul (KR); Jun Taek Lee, Seoul (KR); Byung Wook Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 48 days.

(21) Appl. No.: 16/580,627

(22) Filed: Sep. 24, 2019

(65) Prior Publication Data

US 2020/0021181 A1 Jan. 16, 2020

Related U.S. Application Data

(63) Continuation of application No. 15/548,697, filed as application No. PCT/KR2016/001064 on Feb. 1, 2016, now Pat. No. 10,468,959.

(30) Foreign Application Priority Data

Feb. 4, 2015 (KR) .................. 10-2015-0017225
Mar. 11, 2015 (KR) .................. 10-2015-0033565

(51) Int. Cl.
*H02K 41/035* (2006.01)
*H02K 33/18* (2006.01)
(Continued)

(52) U.S. Cl.
CPC .......... *H02K 41/0356* (2013.01); *G02B 7/09* (2013.01); *G02B 27/08* (2013.01); *G02B 27/646* (2013.01);
(Continued)

(58) Field of Classification Search
CPC .... H02K 41/0356; H02K 11/21; H02K 33/18; H02K 2201/18; H02K 2203/12;
(Continued)

(56) References Cited

U.S. PATENT DOCUMENTS 9,360,653 B2  6/2016  Lee et al.
9,380,193 B2  6/2016  Park et al.
(Continued)

FOREIGN PATENT DOCUMENTS

CN     101572358 A     11/2009
CN     101840129 A      9/2010
(Continued)

OTHER PUBLICATIONS

International Search Report in International Application No. PCT/KR2016/001064, filed Feb. 1, 2016.
(Continued)

*Primary Examiner* — Collin X Beatty
(74) *Attorney, Agent, or Firm* — Saliwanchik, Lloyd & Eisenschenk

(57) ABSTRACT

A lens moving apparatus, according to one embodiment, comprises: a bobbin having a first coil installed on the outer circumferential surface thereof; a location detection sensor equipped to the bobbin; a housing in which the bobbin is provided; an upper elastic member disposed on the upper side of the housing; and a support member that supports the housing such that the housing can move in a second or third direction that is perpendicular to a first direction, wherein the upper elastic member is divided into a plurality of parts, at least two of which are disposed parallel to each other on the x-y plane in the second or third direction and are disposed such that end portions thereof face each other.

20 Claims, 20 Drawing Sheets

(51) Int. Cl.
*G03B 3/10* (2021.01)
*H02K 11/21* (2016.01)
*G02B 27/08* (2006.01)
*G02B 7/09* (2021.01)
*G02B 27/64* (2006.01)
*G03B 13/36* (2021.01)

(52) U.S. Cl.
CPC ............... *G03B 3/10* (2013.01); *G03B 13/36* (2013.01); *H02K 11/21* (2016.01); *H02K 33/18* (2013.01); *G03B 2205/0007* (2013.01); *G03B 2205/0069* (2013.01); *H02K 2201/18* (2013.01); *H02K 2203/12* (2013.01); *H02K 2205/00* (2013.01)

(58) Field of Classification Search
CPC ...... H02K 2205/00; G02B 7/09; B02B 27/08; B02B 27/646; G03B 3/10; G03B 13/36; G03B 2205/0007; G03B 2205/0069
USPC .......................................................... 359/824
See application file for complete search history.

(56) References Cited

U.S. PATENT DOCUMENTS

| | | | |
|---|---|---|---|
| 9,497,364 | B2 | 11/2016 | Kim et al. |
| 9,690,070 | B2 | 6/2017 | Lee et al. |
| 9,977,255 | B2 | 5/2018 | Park et al. |
| 10,042,178 | B2 | 8/2018 | Park et al. |
| 10,054,799 | B2 | 8/2018 | Park et al. |
| 2016/0109719 | A1 | 4/2016 | Cho et al. |
| 2016/0259144 | A1 | 9/2016 | Lee et al. |
| 2016/0377881 | A1 | 12/2016 | Jung et al. |
| 2017/0017056 | A1 | 1/2017 | Park et al. |
| 2018/0095239 | A1 | 4/2018 | Lee et al. |
| 2018/0314076 | A1 | 11/2018 | Park et al. |

FOREIGN PATENT DOCUMENTS

| | | |
|---|---|---|
| CN | 102047164 A | 5/2011 |
| CN | 202268504 U | 6/2012 |
| CN | 102645615 A | 8/2012 |
| CN | 103969916 A | 8/2014 |
| CN | 104216199 A | 12/2014 |
| KR | 10-2012-0100509 A | 9/2012 |
| KR | 10-2013-0138975 A | 12/2013 |
| KR | 10-2013-0141417 A | 12/2013 |
| KR | 10-2014-0001640 A | 1/2014 |
| KR | 10-2014-0011850 A | 1/2014 |
| TW | 201401860 A | 1/2014 |

OTHER PUBLICATIONS

Office Action dated Jul. 31, 2019 in Chinese Application No. 201680014095.X.
Office Action dated Apr. 2, 2020 in Chinese Application No. 201680014095.X.

— 1300

— 1150

— 1120

— 1110

— 1140

— 1130

— 1160

— 1220

— 1230
— 1231

— 1250

— 1210

LENS MOVING APPARATUS AND CAMERA MODULE INCLUDING SAME

CROSS-REFERENCE TO RELATED APPLICATIONS

This application is a continuation of U.S. application Ser. No. 15/548,697, filed Aug. 3, 2017; which is the U.S. national stage application of International Patent Application No. PCT/KR2016/001064, filed Feb. 1, 2016, which claims priority to Korean Application No. 10-2015-0017225, filed Feb. 4, 2015, and Korean Application No. 10-2015-0033565, filed Mar. 11, 2015, the disclosures of each of which are incorporated herein by reference in their entirety.

TECHNICAL FIELD

Embodiments relate to a lens moving apparatus and a camera module including the same.

BACKGROUND ART

The statements in this section merely provide background information on the embodiments and do not constitute the prior art.

Recently, IT products such as mobile phones, smartphones, tablets, and laptops, which incorporate ultra-compact digital cameras, are under active development.

IT products, in which conventional ultra-compact digital cameras are incorporated, are equipped with a lens moving apparatus having an autofocusing device for aligning a focal distance of a lens by adjusting the distance between the lens and an image sensor for converting external light into a digital image or digital video is provided.

However, in the case of such a lens moving apparatus, resonance caused by mechanical vibration may be a problem, and improvement is required.

The lens moving apparatus and the camera module including the same may be equipped with multiple parts bonded together by an adhesive. Therefore, assembly defects may occur during an adhering step using an adhesive, and therefore improvement is required.

DISCLOSURE

Technical Problem

Embodiments provide a lens moving apparatus having a structure capable of suppressing resonance caused by mechanical vibration which may occur in autofocusing or correction of camera shake, and a camera module including the same.

In addition, embodiments provide a lens moving apparatus which may reduce assembly defects during an adhering step using an adhesive.

The technical objects that can be achieved through the embodiments are not limited to what has been particularly described hereinabove and other technical objects not described herein will be more clearly understood by persons skilled in the art from the following detailed description.

Technical Solution

In one embodiment, a lens moving apparatus includes a bobbin having a first coil arranged on an outer circumferential surface thereof, a position detection sensor provided to the bobbin, a housing having the bobbin arranged on an inner side thereof, an upper elastic member disposed on an upper side of the housing, and a support member configured to support the housing so as to be movable in a second direction or a third direction perpendicular to a first direction, wherein the upper elastic member is divided into a plurality of parts, and at least two of the parts are arranged in parallel with each other in an x-y plane in the second direction or the third direction, wherein the at least two parts may be arranged such that one-side ends of the at least two parts face each other.

In another embodiment, a lens moving apparatus includes a bobbin having a first coil arranged on an outer circumferential surface thereof, a housing having the bobbin arranged on an inner side thereof, a first magnet fixed to the housing, a second coil arranged on a lower side of the first magnet to face the first magnet, a printed circuit board arranged on a lower side of the second coil and having a terminal surface allowing terminals to be installed thereon, and a base arranged under the bobbin and having the printed circuit board seated thereon and bonded, wherein a lower surface of the base may have a portion provided with a first recessed portion, the terminal surface of the printed circuit board being bonded to the portion.

In another embodiment, a camera module includes the lens moving apparatus, and an image sensor mounted on the lens moving apparatus.

Advantageous Effects

In embodiments, an upper elastic member is divided into parts, and a portion of the divided parts may be arranged in parallel to increase the elastic modulus, spring constant or rigidity of the upper elastic member, thereby suppressing unnecessary tilt and shift of a bobbin or a housing in operation of the lens moving apparatus.

In embodiments, since an extra adhesive may be accommodated in a first depression provided on the lower side of a base, the adhesive may be inhibited from forming a protrusion on the bottom surface of the base.

BEST MODE

Figure 1:
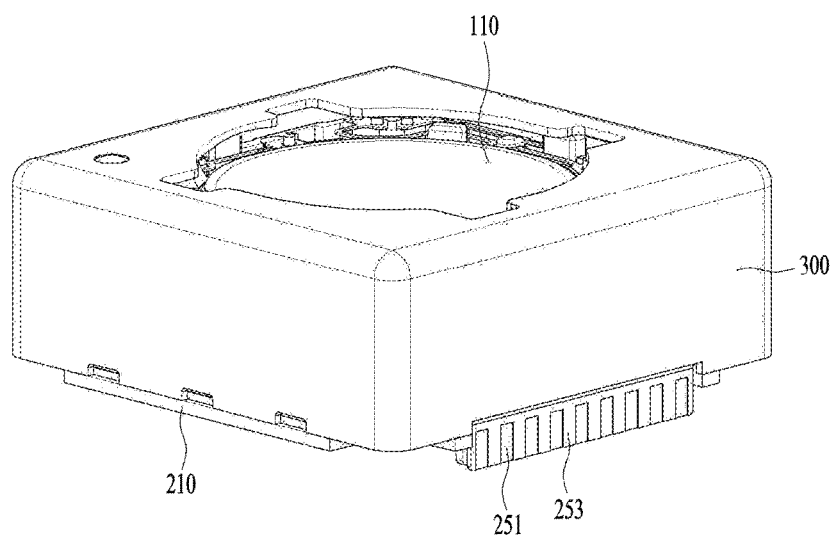
FIG. 1 is a perspective view showing a lens moving apparatus according to an embodiment.

Hereinafter, embodiments will be described in detail with reference to the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments. The sizes and shapes of the components shown in the drawings may be exaggerated for clarity and convenience.

It may be understood that, although the terms "first," "second," etc. may be used herein to describe various elements, these elements are not to be limited by these terms. These terms are only used to distinguish one element from another. In addition, terms particularly defined in consideration of the construction and operation of the embodiments are used only to describe the embodiments, but do not limit the scope of the embodiments.

In the description of the embodiments, it is to be understood that when an element is described as being "on" or "under" another element, it can be "directly" on or under another element or can be "indirectly" formed such that one or more other intervening elements are also present between the two elements. In addition, when an element is described as being "on" or "under," the term "on" or "under" may refer to not only the upper side but also the lower side with respect to the element.

It is also to be understood that relational terms, such as on/upper portion/above and under/lower portion/below, are used only to distinguish between one subject or element and another subject or element without necessarily requiring or involving any physical or logical relationship or sequence between such subjects or elements.

Further, in the drawings, a Cartesian coordinate system (x, y, z) may be used. In the drawings, the x-axis and y-axis mean axes perpendicular to the optical axis. For simplicity, the optical axis direction (z-axis direction) may be referred to as a first direction, the x-axis direction as a second direction, and the y-axis direction as a third direction.

Figure 2:
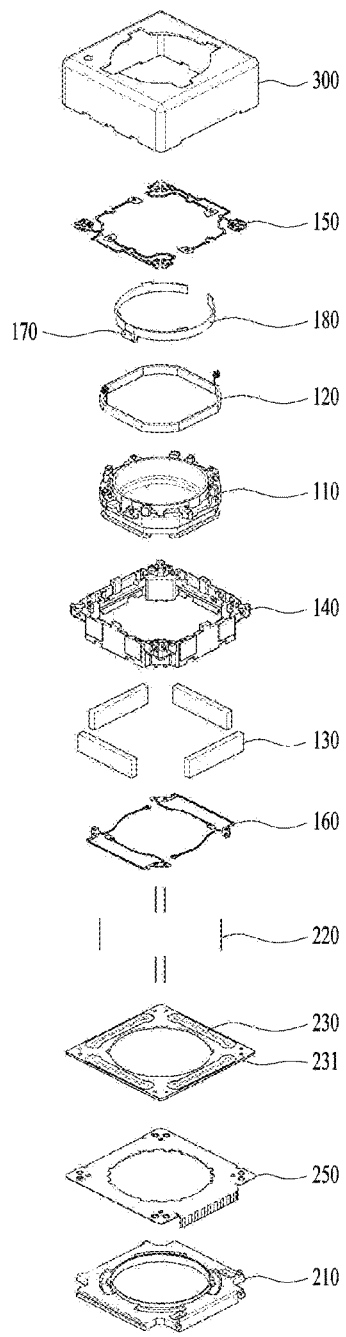
FIG. 2 is an exploded perspective view showing a lens moving apparatus according to an embodiment.

FIG. 1 is a perspective view showing a lens moving apparatus according to an embodiment. FIG. 2 is an exploded perspective view showing a lens moving apparatus according to an embodiment.

A hand-tremor correction device applied to a small-sized camera module of a mobile device such as a smartphone or a tablet PC is a device that is configured to inhibit the edge line of a captured image from being blurred due to vibration caused by handshaking of a user at the time of capturing a still image.

An autofocusing device is a device that automatically focuses an image of a subject on an image sensor (not shown). The hand-tremor correction device and the autofocusing device may be configured in various ways. In an embodiment, the optical module including a plurality of lenses may be moved in the first direction or may be moved with respect to a plane orthogonal to the first direction to perform hand-tremor correction and/or autofocus.

As shown in FIGS. 1 and 2, the lens moving apparatus according to an embodiment may include a movable unit. Here, the movable unit may perform the functions of autofocusing of the lens and hand-tremor correction. The movable unit may include a bobbin 110, a first coil 120, a first magnet 130, a housing 140, an upper elastic member 150, a lower elastic member 160, a position detection sensor 170, and a sensor substrate 180.

The bobbin 110 is arranged inside the housing 140 and is provided on the outer circumferential surface thereof with the first coil 120, which is disposed inside the first magnet 130. The bobbin may be installed to reciprocate in the inner space of the housing 140 in the first direction by electromagnetic interaction between the first magnet 130 and the first coil 120. The first coil 120 may be installed on the outer circumferential surface of the bobbin 110 so as to electromagnetically interact with the first magnet 130.

In addition, the bobbin 110 is elastically supported by the upper and lower elastic members 150 and 160, and thus may move in the first direction to perform the autofocus function.

The bobbin 110 may include a lens barrel (not shown) in which at least one lens is installed. The lens barrel may be coupled to the inside of the bobbin 110 in various ways.

For example, female threads may be formed on the inner circumferential surface of the bobbin 110, male threads corresponding to the female threads may be formed on the outer circumferential surface of the lens barrel, and the lens barrel may be screwed onto the bobbin 110. However, embodiments are not limited thereto, and the lens barrel may be directly fixed to the inside of the bobbin 110 by a method other than screw-coupling, without forming threads on the inner circumferential surface of the bobbin 110. Alternatively, the one or more lenses may be integrated with the bobbin 110 without a lens barrel.

The lens coupled to the lens barrel may be composed of a single lens, or two or more lenses may be configured to construct an optical system.

The autofocus function may be controlled according to the direction of the current, and be implemented by moving the bobbin 110 in the first direction. For example, the bobbin 110 may move upward from the initial position when forward current is applied, and may move downward from the initial position when reverse current is applied. Alternatively, the amount of the current in one direction may be adjusted to increase or decrease the movement distance from the initial position in one direction.

The upper and lower surfaces of the bobbin 110 may have a plurality of upper support protrusions and a plurality of lower support protrusions. The upper support protrusions may be formed in a cylindrical shape or a prismatic shape, and coupled and fixed to the upper elastic member 150. The lower support protrusions may be may be formed in a cylindrical shape or a prismatic shape like the upper support protrusions, and coupled and fixed to the lower elastic member 160.

Here, the upper elastic member 150 may have through holes corresponding to the upper support protrusions, and the lower elastic member 160 may have through holes corresponding to the lower support protrusions. The respective support protrusions and the through holes may be fixedly connected by thermal bonding or an adhesive such as epoxy.

The housing 140 has a hollow column shape for supporting the first magnet 130, and may be approximately rectangular in shape. The first magnet 130 and support members 220 may be coupled to the lateral surface of the housing 140. As described above, the bobbin 110, which is guided by the elastic members 150 and 160 to move in the first direction, may be disposed inside the housing 140.

The upper elastic member 150 and the lower elastic member 160 may be coupled to the housing 140 and the bobbin 110. The upper elastic member 150 and the lower elastic member 160 may elastically support the ascending and/or descending movement of the bobbin 110 in the direction of the arrow. The upper elastic member 150 and the lower elastic member 160 may be formed as leaf springs.

As shown in FIG. 2, the upper elastic member 150 may include a plurality of parts separated from each other. With this multi-divisional structure, the divided parts of the upper elastic member 150 may be supplied with electric currents of different polarities or different powers. The lower elastic member 160 may also have a multi-divisional structure and be electrically connected to the upper elastic member 150.

The upper elastic member 150, the lower elastic member 160, the bobbin 110, and the housing 140 may be assembled through thermal bonding and/or bonding using an adhesive or the like.

The position detection sensor 170 may be coupled to the bobbin 110 and move together with the bobbin 110. The position detection sensor 170 may sense displacement of the bobbin 110 in the first direction and output the sensing result as a feedback signal. The displacement of the bobbin 110 in the first direction may be controlled using the result of sensing the displacement of the bobbin 110 in the first direction as the feedback signal.

The position detection sensor 170 may be a sensor configured to sense change in magnetic force emitted from the first magnet 130. In addition, the position detection sensor 170 may include a Hall sensor, an angular velocity sensor, and an acceleration sensor.

However, this is simply illustrative, and the position detection sensor 170 of the present disclosure is limited to a Hall sensor, and any sensor capable of sensing change in magnetic force may be used. Any sensor capable of sensing position in addition to magnetic force may be employed. For example, a photo reflector or the like may be employed.

The position detection sensor 170 may be coupled to the bobbin 110 or the housing 140 in various forms, and current may be applied to the position detection sensor 170 in various ways depending on the arrangement of the position detection sensor 170.

As shown in FIG. 1, for example, the position detection sensor 170 may be indirectly coupled to the bobbin 110. As shown in the figure, the position detection sensor 170 may be coupled to the sensor substrate 180 and the sensor substrate 180 may be coupled to the bobbin 110. That is, the position detection sensor 170 may be indirectly coupled to the bobbin 110 through the sensor substrate 180.

In this case, a sensing magnet may be disposed separately from the first magnet 130, or the first magnet 130 may be used as a sensing magnet.

Hereinafter, it will be described that the position detection sensor 170 is coupled to the bobbin 110 through the sensor substrate 180, and the first magnet 130 is used as a sensing magnet, but embodiments are not limited thereto.

A base 210 may be disposed under the bobbin 110 and be approximately rectangular in shape, and a printed circuit board 250 may be disposed or seated thereon.

A support groove having a size corresponding to a part of the printed circuit board 250 provided with a terminal surface 253 may be formed on a surface of the base 210 facing the part of the printed circuit board 250. The support groove may be recessed to a certain depth from the outer circumferential surface of the base 210 such that the part provided with the terminal surface 253 may not protrude outward or the degree of protruding may be adjusted.

The support member 220 may be disposed on the lateral surface of the housing 140 so as to be spaced apart from the housing 140 and have an upper side coupled to the upper elastic member 150 and a lower side connected to the base 210, the printed circuit board 250, or a circuit member 231. The support member may support the bobbin 110 and the housing 140 such that the bobbin 110 and the housing 140 may be moved in the second direction and/or the third direction perpendicular to the first direction, and may be electrically connected to the first coil 120.

Since the support members 220 according to an embodiment are disposed on and spaced apart from the outer surface of the corners of the housing 140, four pairs of support members 220 or eight support members 220 may be installed symmetrically. In the embodiment, the support members 220 of each pair are disposed adjacent to each other and each pair is disposed at a corner of the housing 140. However, four or six support members 220 may be provided separately or in pairs at each corner of the housing 140.

At least a portion of the support members 220 may be electrically connected to the upper elastic member 150. That is, for example, the support members 220 may be electrically connected to a portion of the upper elastic member 150 where the through holes are formed.

Since the support members 220 are formed separately from the upper elastic member 150, the support member 220 and the upper elastic member 150 may be electrically connected through a conductive adhesive, soldering, or the like. Accordingly, the upper elastic member 150 may apply an electric current to the first coil 120 through the electrically connected support member 220.

The support members 220 may be connected to the printed circuit board 250 through the through holes formed in the circuit member 231 and the printed circuit board 250. Alternatively, the through holes may not be formed in the circuit member 231 and/or the printed circuit board 250, and the support members 220 may be electrically soldered to a corresponding portion of the circuit member 231.

In FIG. 2, linear support members 220 are shown as one embodiment, but embodiments are not limited thereto. That is, the support members 220 may be provided in the form of a plate member or the like.

The second coil 230 may move the housing 140 in the second and/or third directions through electromagnetic interaction with the first magnet 130 to perform hand-tremor correction.

Here, the second and third directions may include directions substantially close to the x-axis (or the first direction) and the y-axis (or the second direction), as well as the x-axis and y-axis directions. That is, in terms of driving in the embodiment, the housing 140 may move parallel to the x-axis and y-axis, or may be slightly inclined with respect to the x-axis and y-axis when moved while being supported by the support members 220.

Therefore, the first magnet 130 needs to be installed at a position corresponding to the second coil 230.

The second coil 230 may be disposed to face the first magnet 130 fixed to the housing 140. In an embodiment, the second coil 230 may be disposed outside the first magnet 130. Alternatively, the second coil 230 may be disposed on the lower side of the first magnet 130 and spaced apart therefrom by a predetermined distance.

According to the embodiment, a total of four second coils 230 may be provided on four side portions of the circuit member 231, but embodiments are not limited thereto. For example, only two coils, one coil for the second direction and the other coil for the third direction, may be provided, or four or more coils may be provided.

Alternatively, six second coils may be disposed such that one coil for the second direction is disposed on a first side, two coils for the second direction are disposed on a second side, one coil for the third direction is disposed on a third side, and two coils for the third direction are disposed on a fourth side. Alternatively, in this case, the first side and the fourth side may be adjacent to each other, and the second side and the third side may be adjacent to each other.

In an embodiment, a circuit pattern in the shape of the second coil 230 may be formed on the circuit member 231, or a separate second coil may be disposed on the circuit member 231. However, embodiments are not limited thereto, and a circuit pattern in the shape of the second coil 230 may be formed directly on the member 231.

Alternatively, the second coil 230 may be formed by winding a wire in a toroidal shape or configured in the form of an FP coil and electrically connected to the printed circuit board 250.

The circuit member 231 including the second coil 230 may be installed or disposed on the upper surface of the printed circuit board 250 disposed on the upper side of the base 210. However, embodiments are not limited thereto. The second coil 230 may be disposed in close contact with the base 210, may be spaced apart therefrom, or may be formed on a separate substrate, which is stacked on and connected to the printed circuit board 250.

The printed circuit board 250 may be electrically connected to at least one of the upper elastic member 150 and the lower elastic member 160 and be coupled to the upper surface of the base 210, and, as shown in FIG. 2, may be provided with through holes at positions corresponding to the ends of the support members 220. Alternatively, it may be electrically connected and/or bonded to the support members with the through holes omitted.

A terminal 251 may be disposed or formed on the printed circuit board 250. The terminal 251 may be disposed on the bent terminal surface 253. A plurality of terminals 251 may be disposed on the terminal surface 253 to receive external power to supply current to the first coil 120 and/or the second coil 230. The number of terminals formed on the terminal surface 253 may be increased or decreased depending on the type of components that need to be controlled. In addition, the printed circuit board 250 may have one or more terminal surfaces 253.

The cover member 300 may be approximately formed in a box shape and may accommodate the moving unit, the second coil 230, a portion of the printed circuit board 250, and the like, and may be coupled to the base 210. The cover member 300 may protect the movable unit, the second coil 230, the printed circuit board 250 and the like accommodated therein from being damaged and further restricts leakage of an electromagnetic field generated by the first magnet 130, the first coil 120, the second coil 230, and the like such that the electromagnetic field may be focused.

Figure 3:
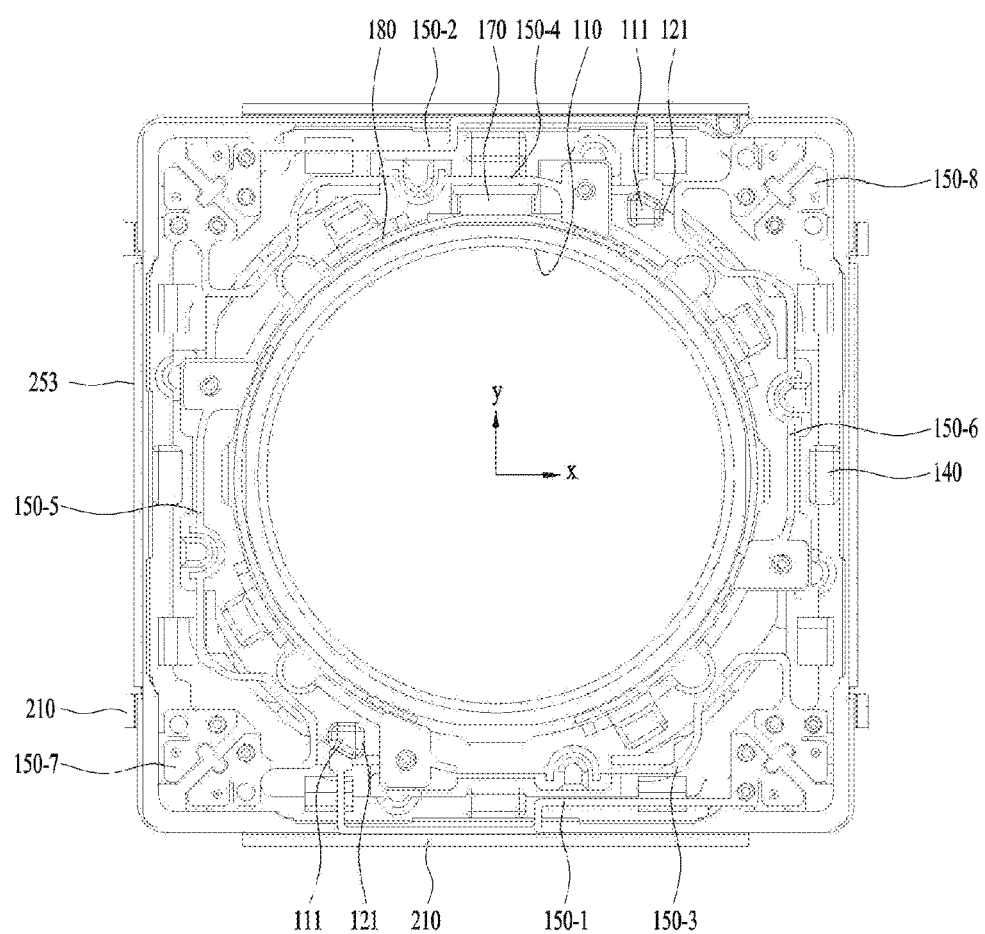
FIG. 3 is a plan view showing a lens moving apparatus with a cover member removed therefrom according to an embodiment.
Figure 4:
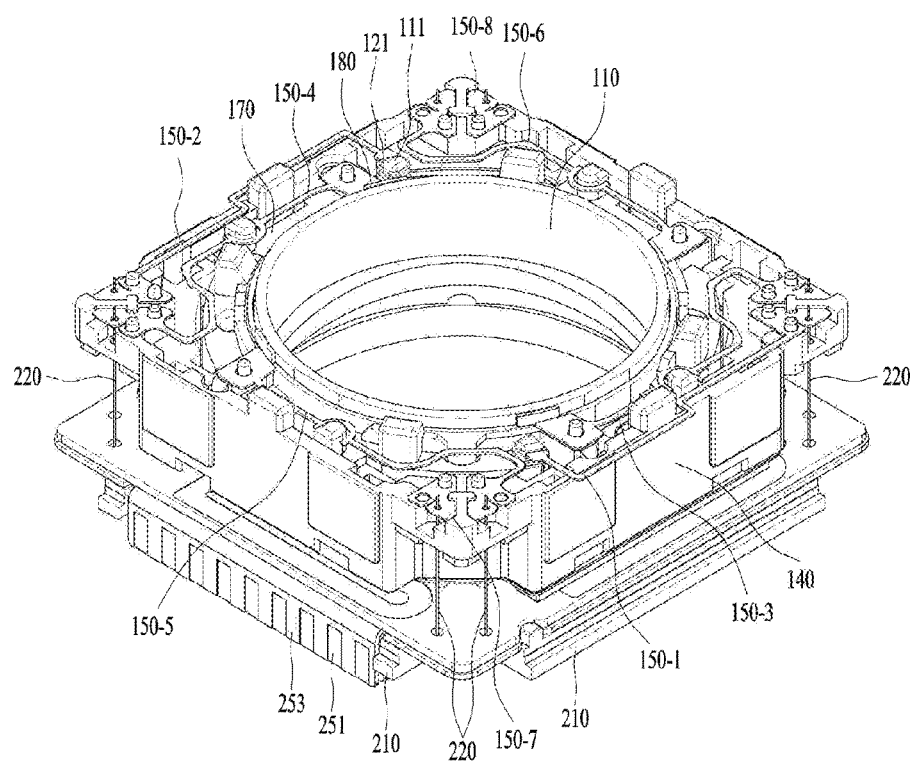
FIG. 4 is a perspective view of FIG. 3.
Figure 5:
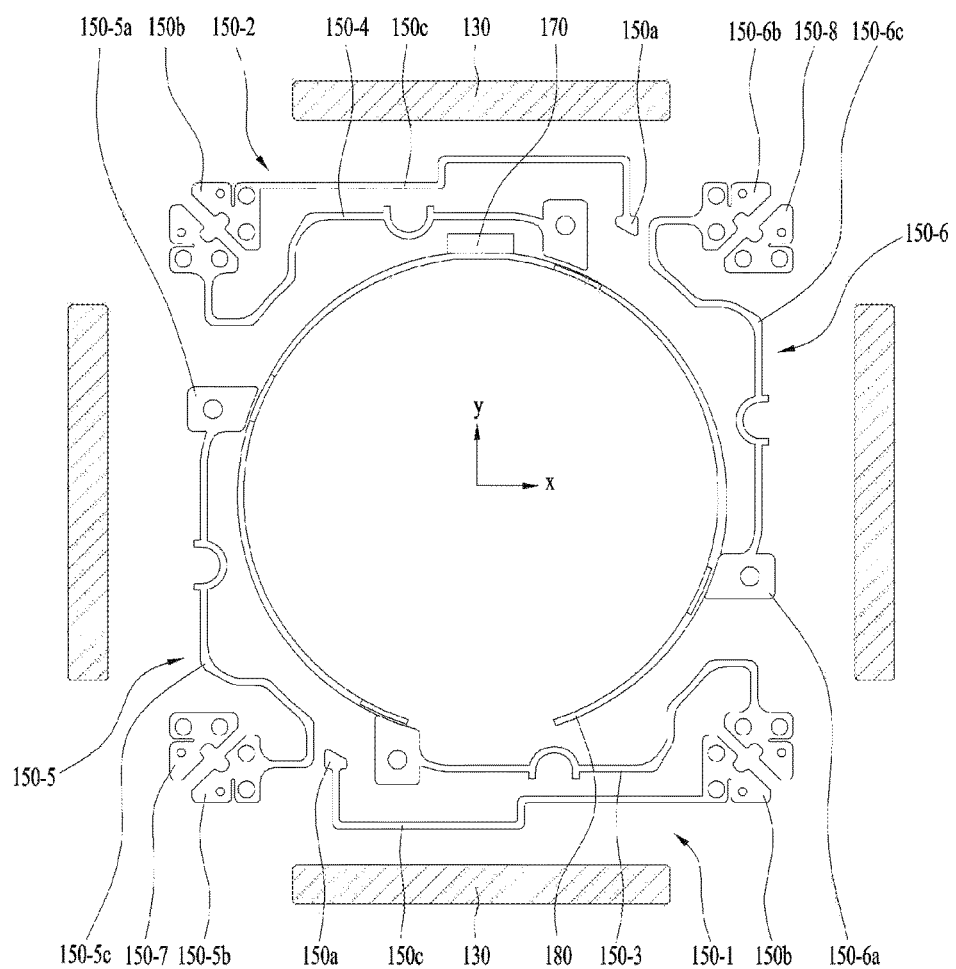
FIG. 5 is a plan view illustrating arrangement of an upper elastic member and a first magnet in a lens moving apparatus according to an embodiment.

FIG. 3 is a plan view showing a lens moving apparatus with a cover member removed therefrom according to an embodiment. FIG. 4 is a perspective view of FIG. 3. FIG. 5 is a plan view illustrating arrangement of an upper elastic member 150 and a first magnet in a lens moving apparatus according to an embodiment.

As shown in FIGS. 3 to 5, in an embodiment, the upper elastic member 150 may be divided into a plurality of parts, and at least two of the parts may be arranged in parallel in the second direction or the third direction in the x-y plane. The at least two parts may be arranged such that one end of each of the at least two parts is disposed opposite to the ends of the other parts.

In addition, the upper elastic member 150 may be arranged such that at least some of the parts are symmetrical in the x-y plane with respect to the center of the bobbin, or are not perfectly symmetrical, but correspond to each other.

For example, the upper elastic member 150 may be divided into a plurality of parts, and at least two of the parts may be adjacent to each other and arranged in parallel or in the second direction or the third direction. The divided upper elastic member 150 may have a point-symmetrical shape or an almost point-symmetrical shape in the x-y plane with respect to the center of the bobbin 110.

Here, point symmetry means symmetry in which two shapes overlap each other when two shapes are rotated 180 degrees with respect to one rotation center. Referring to FIGS. 3 to 5, in an embodiment, a first upper elastic member 150-1 and a second upper elastic member 150-2 may form point symmetry with respect to the center of the bobbin 110.

In FIGS. 3 to 5, two adjacent parts of the upper elastic member 150 may be arranged in parallel in the x-axis direction, that is, in the second direction or have sections arranged in parallel with each other.

In addition, the two parts disposed adjacent to each other in the second direction may face two other parts which are on the opposite side of the bobbin 110 and disposed adjacent to each other in the second direction.

However, in another embodiment, it is apparent that the two adjacent parts of the upper elastic member 150 may be arranged in parallel in the y-axis direction, i.e., in the third direction, or have sections arranged parallel to each other.

In addition, the two parts disposed adjacent to each other in the third direction may face two other parts disposed adjacent to each other in the third direction on the opposite side of the bobbin 110.

In other words, every two parts of a total of four parts may be formed on each side and arranged in one of the second direction and the third direction, and each of two parts may be formed on each side and arranged in the other direction. However, embodiments are not limited thereto. The number of the divided parts of the member 150 arranged in the two directions may be adjusted differently. If the number of the divided parts of the upper elastic member 150 is adjusted, the elastic modulus of the upper elastic member 150 may be adjusted accordingly.

Due to the above structure, the elastic modulus, spring constant or rigidity of the upper elastic member 150 may increase in the second direction or the third direction. Particularly, when the lens moving apparatus performs auto-focus or hand-tremor correction, mechanical resonance due to tilt of movement of the bobbin 110 may be suppressed or reduced.

That is, the housing 140 or the bobbin 110 may be tilted or shifted, that is, horizontally moved or rotated to vibrate, and resonance may occur due to the vibration. Due to the high elastic modulus, spring constant or rigidity of the upper elastic member 150 in the second direction or the third direction, the amplitude, size, and the like of the resonance may be reduced.

The primary resonance, the second-order resonance, and the third-order resonance may occur in all cases, as well as in the case when the lens moving apparatus performs autofocus at a natural vibration frequency of a product, spring or elastic member.

When the lens moving apparatus performs autofocus, the primary resonance frequency may be generated by movement of the bobbin 110 in the first direction, the second-order resonance may be generated by tilt of the housing 140 or the bobbin 110 with respect to the first direction, and a second-order resonance frequency, or the third-order resonance frequency may cause shift or rotation. However, according to the shape of the product, spring, or elastic member, shift may correspond to the second-order resonance, tilt may correspond to the third-order resonance, and rotation may correspond to the fourth-order resonance.

That is, in performing autofocusing, the primary resonance frequency may occur in the first direction, and the tilt, shift, and rotation occurring in the second direction or the third direction may correspond to the second, third and fourth order resonances according to the shape of the product, the spring, or the elastic member.

When the lens moving apparatus performs hand-tremor correction, the primary resonance frequency may be generated in movement of the housing 110 in the second direction (or the x-axis direction) or the third directions (y-axis direction), rotation of the housing 140 with respect to the second or third direction may correspond to the second order resonance frequency, and shift or tilt may correspond to the third order resonance frequency. However, the primary resonance frequency may be generated in the second or third direction, and the tilt, shift, and rotation that occur with respect to the second direction or third direction may be a second order, third order and fourth order frequencies depending on the shape of the product, the spring, or the elastic member.

The divided upper elastic member 150 may include first to eighth upper elastic members according to the respective parts thereof. That is, the first to eighth upper elastic members may constitute the respective parts of the upper elastic member 150, and all or a portion of the parts may be coupled to the housing 140 or the bobbin 110 to elastically support movement of the bobbin 110 in the first direction.

That is, one side of the upper elastic member 150-1 may be connected to the first coil 120, the opposite side thereof may be connected to the support members 220, and a portion of the upper elastic member 150-1 may be disposed in the second direction or the third direction. However, in the embodiment, most of the first upper elastic member 150-1 is illustrated as being arranged substantially in the x-axis direction, that is, the second direction.

Of course, in other embodiments, most of the first upper elastic member 150-1 may be arranged substantially in the y-axis direction, i.e., the third direction. Hereinafter, for simplicity, embodiments in which the first to eighth upper elastic members, which are allowed to be disposed in either the second direction or the third direction, are arranged in only one of the second direction and the third direction will be shown and described.

The second upper elastic member 150-2 may be arranged to face the first upper elastic member 150-1 with the center of the bobbin 110 placed therebetween. For example, the second upper elastic member 150-2 and the first upper elastic member 150-1 may form point symmetry with respect to the center of the bobbin 110, have a point-symmetric shape, or be placed at positions closely forming point symmetry, in the x-y plane.

Similar to the first upper elastic member 150-1, the second upper elastic member 150-2 may have one side connected to the first coil 120 and the opposite side connected to the support members 220.

As shown in FIG. 5, the first upper elastic member 150-1 or the second upper elastic member 150-2 may include a first coil coupling portion 150a, a first support member coupling portion 150b and a first connector 150c.

The first coil coupling portion 150a may be electrically connected to an end 121 of the first coil 120. The first coil coupling portion 150a may be electrically coupled to the end 121 of the first coil 120, that is, the end tip portion by soldering, a conductive adhesive, or the like.

The first support member coupling portion 150b may be electrically connected to the end of the support member 220. In an embodiment, the first support member coupling portion 150b may be provided with a hole or a groove for coupling with the wire-shaped support member 220, and the upper ends of the support members 220 may be inserted into or disposed in the hole or groove.

The support members 220 may be electrically connected to the first support member coupling portion 150b by soldering, a conductive adhesive, or the like.

Accordingly, the first coil 120 may be electrically connected to the printed circuit board 250 through the first upper elastic member 150-1 and the support members 220, thereby being provided with current necessary for operation of the bobbin 110 from the printed circuit board 250.

At least a portion of the first connector 150c may be arranged in the second direction and/or the third direction and serve to connect the first coil coupling portion 150a and the first support member coupling portion 150b to each other. In the embodiment, it is illustrated that the first connector 150c is arranged in the second direction as a whole.

Referring to FIGS. 3 to 5, the first connectors 150c of the first upper elastic member 150-1 and the second upper elastic member 150-2 may be arranged adjacent and parallel to portions of the third upper elastic member 150-3 and the fourth upper elastic member 150-4, respectively, and have sections arranged in parallel with the third upper elastic member 150-3 and the fourth upper elastic member 150-4 in the second direction.

Due to the structure of the first connectors 150c, in an embodiment, the elastic modulus, spring constant, or rigidity of the upper elastic member 150 may increase when the first upper elastic member 150-1 and the second upper elastic member 150-2 are not provided.

Due to this structural that increases the elastic modulus, spring constant, or rigidity, when the lens moving apparatus performs autofocus or hand-tremor correction, the upper elastic member 150 may reduce amplitude or magnitude of the resonance caused by tilt or shift by rotation of the housing 140 or the bobbin 110, thereby attenuating or reducing the resonance.

In an embodiment, since both ends 121 of the first coil 120 are electrically connected to the printed circuit board 250, such that current may be applied thereto, both ends 121 of the first coil 120 may be electrically connected to the printed circuit board 250 through the first upper elastic member 150-1 and the second upper elastic member 150-2, respectively.

One side of the third upper elastic member 150-3 may be coupled to the bobbin 110 and electrically connected to the position detection sensor 170, and the opposite side of the third upper elastic member 150-3 may be coupled to the housing 140 and electrically connected to the support members 220.

The third upper elastic member 150-3 may be arranged in parallel with the first upper elastic member 150-1 in the x-y plane and has one-side end arranged to face one-side end of the first upper elastic member 150-1.

For example, a part of the third upper elastic member 150-3 may be arranged in parallel with the first upper elastic member 150-1 in the x-y plane in the same direction. Accordingly, as described above, the first upper elastic member 150-1 and the third upper elastic member 150-3 may be disposed parallel to each other to increase the elastic modulus, spring constant, or rigidity of the entire upper elastic member 150.

One side of the third upper elastic member 150-3 may be electrically connected to the position detection sensor 170 and the other side thereof may be connected to the support members 220. Although not shown, one side of the third upper elastic member 150-3 may be electrically connected to the position detection sensor 170 through a conductive wire or other conductive members.

As shown in FIG. 5, the other side of the third upper elastic member 150-3 may be provided with holes into which the support members 220 are inserted, and upper ends of the support members 220 may be coupled with the third upper elastic member 150-3 by soldering, a conductive adhesive, or the like.

Therefore, the position detection sensor 170 may be electrically connected to the printed circuit board 250 through the third upper elastic member 150-3 and the support members 220, and may sense the value of a displacement of the bobbin 110 in the first direction by the current applied thereto from the printed circuit board 250 or transmit the sensed displacement value to the printed circuit board 250 as a feedback signal.

The number of parts of the upper elastic member 150 electrically connected to the position detection sensor 170 may be adjusted according to the number of input terminals and output terminals provided to the position detection sensor 170.

The number of parts electrically connected to the position detection sensor 170 may be equal to the number of the input terminals and output terminals of the position detection sensor 170.

In one embodiment, the position detection sensor 170 may be provided with two input terminals and two output terminals. Therefore, the upper elastic member 150 may need to have a total of four parts to be electrically connected to the position detection sensor 170, but embodiments are not limited thereto.

Referring to FIGS. 3 to 5, in an embodiment, the third, fourth, fifth, and sixth upper elastic members may be electrically connected to the position detection sensor 170 to apply current to the position detection sensor 170 or may serve as an electrical path along which the value of displacement of the bobbin 110 in the first direction is transmitted to the printed circuit board 250 as a feedback signal.

The fourth upper elastic member 150-4 may be disposed in parallel with the second upper elastic member 150-2 in the x-y plane and have one-side end arranged facing one-side end of the second upper elastic member 150-2.

For example, the fourth upper elastic member 150-4 may have a shape point-symmetrical to the third upper elastic member 150-3 with respect to the center of the bobbin 110 in the x-y plane and be placed at a position where it forms point symmetry.

In addition, one side of the fourth upper elastic member 150-4 may be coupled to the bobbin 110 and electrically connected to the position detection sensor 170. The opposite side of the fourth upper elastic member 150-4 may be coupled to the housing 140 and electrically connected to the support members 220. The fourth upper elastic member 150-4 is electrically connected to the position detection sensor 170 and the support members 220 as described above regarding the third upper elastic member 150-3.

In addition, a portion of the fourth upper elastic member 150-4 may be arranged parallel to the second upper elastic member 150-2 in the x-y plane in the same direction. Therefore, as described above, the second upper elastic member 150-2 and the fourth upper elastic member 150-4 may be arranged in parallel as a whole, and thus the elastic modulus, spring constant, or rigidity of the entire upper elastic member 150 may be increased.

One side of the fifth upper elastic member 150-5 may be coupled to the bobbin 110 and electrically connected to the position detecting sensor 170. The opposite side of the fifth upper elastic member 150-5 may be coupled to the housing 140 and electrically connected to the support members 220. The fifth upper elastic member 150-5 is electrically connected to the position detection sensor 170 and the support members 220 as described above regarding the third upper elastic member 150-3.

In addition, a part of the fifth upper elastic member 150-5 may be disposed perpendicular to a part of the first upper elastic member 150-1 or the second upper elastic member 150-2 in the x-y plane. The fifth upper elastic member 150-5 may include a first bobbin coupling portion 150-5a, a second support member coupling portion 150-5b, and a second connector 150-5c.

The first bobbin coupling portion 150-5a is a portion that is coupled to the bobbin 110 and is electrically connected to the position detection sensor 170. The second support member coupling portion 150-5b is a portion that is coupled to the housing 140 and is electrically connected to the support members 220.

The second connector 150-5c may serve to connect the first bobbin coupling portion 150-5a and the second support member coupling portion 150-5b to each other. For example, at least a portion of the second connector 150-5c may be disposed perpendicular to a portion of the first upper elastic member 150-1 or the second upper elastic member 150-2 in the x-y plane.

The fifth upper elastic member 150-5 may be disposed perpendicular to a portion of the third upper elastic member 150-3 or the fourth upper elastic member 150-4, and the overall shape thereof may be the same as or similar to the shape of the fourth upper elastic member 150-4.

The sixth upper elastic member 150-6 may be arranged to face the fifth upper elastic member 150-5 with the center of the bobbin therebetween. For example, the sixth upper elastic member 150-6 may have a shape point-symmetrical to the fifth upper elastic member 150-5 with respect to the center of the bobbin 110 in the x-y plane and be placed at a position where it forms point symmetry.

In addition, one side of the sixth upper elastic member 150-6 may be coupled to the bobbin 110 and electrically connected to the position detection sensor 170. The opposite side of the sixth upper elastic member 150-6 may be coupled to the housing 140 and electrically connected to the support members 220. The sixth upper elastic member 150-6 is electrically connected to the position detection sensor 170 and the support members 220 as described above regarding the third upper elastic member 150-3.

In addition, a portion of the sixth upper elastic member 150-6 may be arranged perpendicular to a portion of the first upper elastic member 150-1 or the second upper elastic member 150-2 in the x-y plane. The sixth upper elastic member 150-6 may include a second bobbin coupling portion 150-6a, a third support member coupling portion 150-6b, and a third connector 150-6c.

The second bobbin coupling portion 150-6a is a portion coupled to the bobbin 110 and electrically connected to the position detection sensor 170. The third support member coupling portion 150-6b is a part coupled to the housing 140 and electrically connected to the support members 220.

The third connector 150-6c may serve to connect the second bobbin coupling portion 150-6a and the third support member coupling portion 150-6b to each other. For example, at least a portion of the third connector 150-6c may be arranged perpendicular to a portion of the first upper elastic member 150-1 or the second upper elastic member 150-2 in the x-y plane.

The sixth upper elastic member 150-6 may be arranged perpendicular to a portion of the third upper elastic member 150-3 or the fourth upper elastic member 150-4, and the shape thereof may be the same as or similar to the third upper elastic member 150-3 or the fourth upper elastic member 150-4.

The seventh upper elastic member 150-7 may be coupled to the housing 140 and the support members 220 and arranged to face the second connector 150-5c. For example, the seventh upper-side elastic member 150-7 may have a shape line-symmetrical to the second connector 150-5c in the x-y plane and be placed at a position where it forms line symmetry.

Line symmetry refers to symmetry in which two shapes overlap each other when folded about a center line. Referring to FIGS. 3 to 5, in an embodiment, the second connector 150-5c and the seventh upper side elastic member 150-7 of the fifth upper elastic member 150-5 may be line-symmetrical to each other with respect to a virtual line expressed as y=x in the x-y plane.

The eighth upper elastic member 150-8 may be coupled to the housing 140 and the support members 220 and arranged to face the third connector 150-6c. For example, the eighth upper elastic member 150-8 may have a shape line-symmetrical to the third connector 150-6c in the x-y plane and be placed at a position where it forms line symmetry.

Referring to FIGS. 3 to 5, in an embodiment, the third connector 150-6c of the sixth upper elastic member 150-6 and the eighth upper elastic member 150-8 may be line-symmetrical to each other with respect to a virtual line expressed as y=−x in the x-y plane.

In addition, as shown in FIGS. 3 to 5, the seventh upper elastic member 150-7 and the eighth upper elastic member 150-8 may be arranged symmetrical to each other with respect to the center of the bobbin 110 or may be arranged to correspond to each other although not perfectly symmetrical to each other. For example, the seventh upper elastic member 150-7 and the eighth upper elastic member 150-8 may have shapes point-symmetrical to each other with respect to the center of the bobbin 110 and be placed at positions where they form point symmetry.

In an embodiment, as shown in FIGS. 3 to 5, the fifth upper elastic member 150-5 and the seventh upper elastic member 150-7 may be spaced apart from each other and separately provided. The sixth upper elastic member 150-6 and the eighth upper elastic member 150-8 may also be spaced apart from each other and separately provided.

In this structure, the connection portions of supports members 220 of the first to eighth upper elastic members 150-8 are arranged radially with respect to the center of the bobbin 110. Accordingly, when the lens moving apparatus performs autofocus or hand-tremor correction, the driving force may be uniformly distributed without being biased in either the first direction or the second direction.

In another embodiment, although not shown, the fifth upper elastic member 150-5 and the seventh upper elastic member 150-7 may be integrally formed. Also, the sixth upper elastic member 150-6 and the eighth upper elastic member 150-8 may be integrally formed.

When the seventh upper elastic member 150-7 and the eighth upper elastic member 150-8 are provided separately from the fifth upper elastic member 150-5 and the sixth upper elastic member 150-6, they are merely mechanically coupled to the support members 220 and are not involved in electrical connection of the lens moving apparatus.

That is, in the embodiment, the number of channels electrically connected to the printed circuit board 250 is six, including four channels of the position detection sensors 170 and two channels of the first coil 120. Accordingly, the fifth upper elastic member 150-5 and the seventh upper elastic member 150-7 may be integrally formed and the sixth upper elastic member 150-6 and the eighth upper elastic member 150-8 may be integrally formed such that the first upper elastic member 150-1 and the second upper elastic member 150-2 are electrically connected to the first coil 120 and the third to sixth upper elastic members 150-6 may be electrically connected to the position detection sensor 170.

More precisely, in order to inhibit the driving force from being biased in either the first direction or the second direction when the lens moving apparatus performs autofocus or hand-tremor correction, the fifth upper elastic member 150-5 and the seventh upper elastic member 150-7 may be integrally formed and the sixth upper elastic member 150-6 and the eighth upper elastic member 150-8 may be integrally formed.

In this case, the integrated fifth and seventh upper elastic members 150-7 and the integrated sixth and eighth upper elastic members 150-8 may be symmetrical with respect to the center of the bobbin 110 or may correspond to each other although not perfectly symmetrical to each other, thereby restricting the driving force of the lens moving apparatus from being biased in either the first direction or the second direction in autofocusing or hand-tremor correction. Further, due to this symmetrical structure, the bobbin may be supported so as not to be biased in any one direction when it is vertically moved.

In order to electrically connect the position detection sensor 170 requiring four electrical connection channels and the first coil 120 requiring two electrical connection channels to the printed circuit board 250, the upper elastic member 150 is preferably divided into at least six parts.

As in the embodiment illustrated in FIGS. 3 to 5, if the upper elastic member 150 is provided such that the first to eighth upper elastic members are arranged to be symmetrical or opposite each other with respect to the center of the bobbin 110, when the lens moving apparatus performs autofocus or hand-tremor correction as described above, the driving force of the lens moving apparatus may be restricted from being biased in any one direction or may be uniformly distributed.

As shown in FIG. 5, the position detection sensor 170 may face the first magnet 130 in the third direction, and also face the first upper elastic member 150-1 or the second upper elastic member 150-2.

Figure 6:
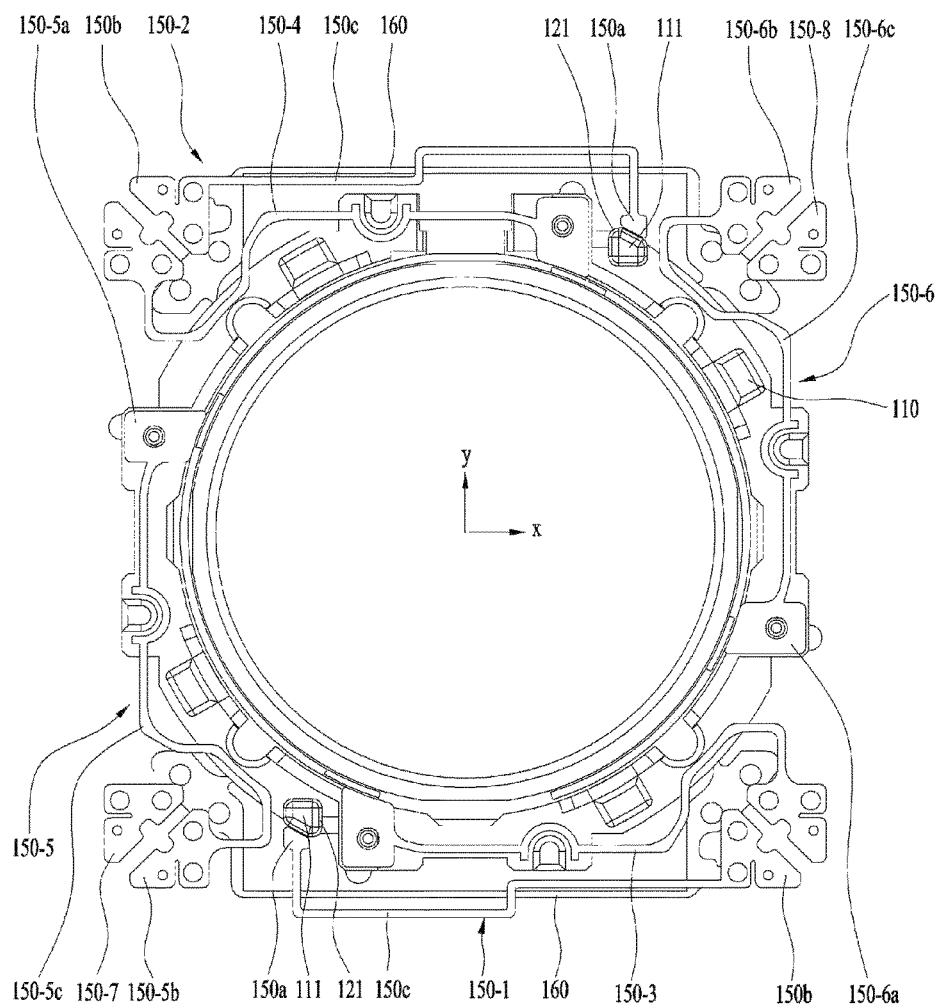
FIG. 6 is a plan view showing a portion of the configuration of a lens moving apparatus according to an embodiment.
Figure 7:
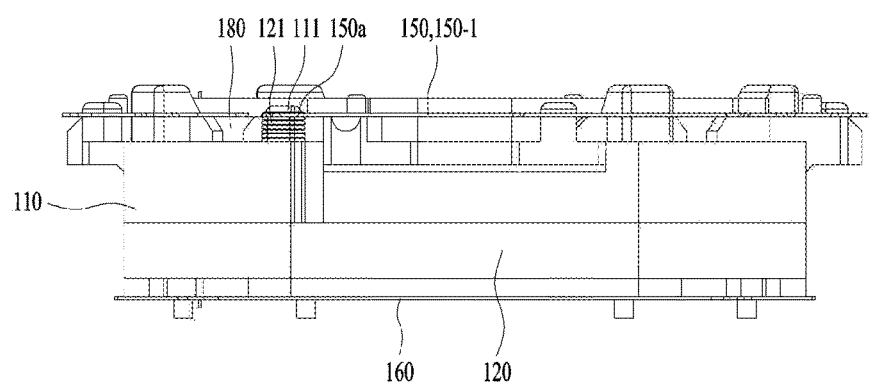
FIG. 7 is a side view of FIG. 6.

FIG. 6 is a plan view showing a portion of the configuration of a lens moving apparatus according to an embodiment. FIG. 7 is a side view of FIG. 6.

The bobbin 110 may be provided with a coupling boss 111 at an upper portion thereof and the end 121 of the first coil 120 may be wound around the coupling boss 111. The end 121 of the first coil 120 and the first coil coupling portion 150a may be soldered to be coupled and electrically connected to each other.

Since the two electrical connection channels of the first coil 120, namely both ends 1210, may be connected to the first upper elastic member 150-1 and the second upper elastic member 150-2, respectively, the bosses 111 may also be provided in a pair. Thereby, the ends 121 of the first coil 120 may be wound around the respective coupling bosses 111, and the first upper elastic member 150-1 and the second upper elastic member 150-2 may be soldered to the ends 121 of the first coil 120 at each of the coupling bosses 111.

Here, the ends 121 of the first coil 120 may be soldered to the first coil coupling portion 150a at the wound portions thereof. The ends 121 of the first coil 120 and the first coil coupling portion 150a may be electrically connected to each other by a conductive adhesive instead of soldering.

The pair of coupling bosses 111 may be arranged to be symmetrical or correspond to each other with respect to the center of the bobbin 110 in the x-y plane. The symmetrical structure of the pair of coupling bosses 111 is intended to arrange the first upper elastic member 150-1 and the second upper elastic member 150-2 to be symmetrical or correspond to each other.

In the case where the lens moving apparatus performs hand-tremor correction, if the centers of gravity of the bobbin 110, the housing 140, and the like are distributed on the lower side, the elastic modulus, spring constant, or rigidity of the lower elastic member 160 needs to be increased to attenuate unnecessary tilt or shift of the bobbin 110 or the housing 110. If the center of gravity of the bobbin 110, the housing 140, and the like is distributed on the upper side, the operation may be performed on the opposite side.

To this end, the lower elastic member 160 may be integrally formed rather than being divided. Such an integrated lower elastic member 160 may increase the elastic modulus, spring constant, or rigidity thereof to suppress tilt or shift of the bobbin 110 or the housing 140.

When the lower elastic member 160 is integrally formed, as described above, the upper elastic member 150 may be divided into at least six parts in order to electrically connect the first coil 120 and the position detection sensor 170 to the printed circuit board 250.

Alternatively, the width and thickness of each frame of the lower elastic member 160 may be increased to increase the elastic modulus, spring constant, or rigidity.

The lower elastic member 160 having the above-described structure may also attenuate resonance caused by tilt or shift of the bobbin 110 or the housing 140 when the lens moving apparatus performs autofocus.

Figure 8:
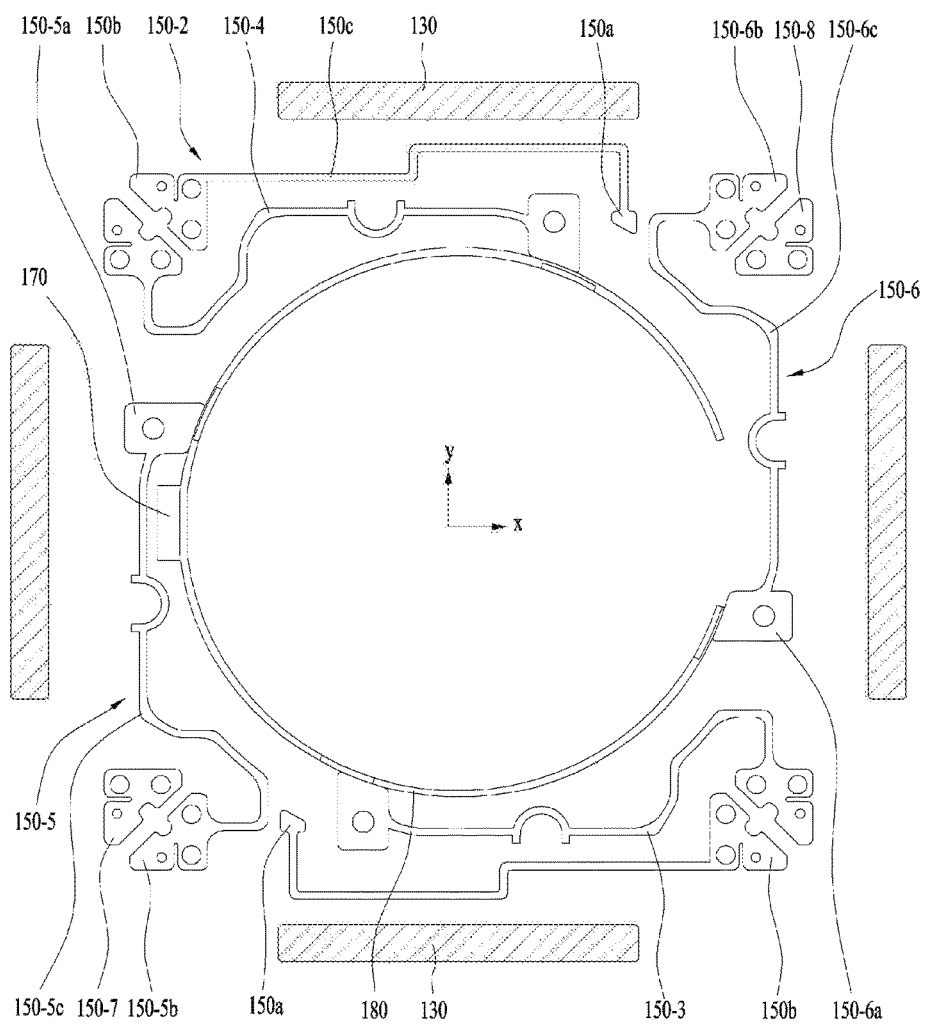
FIG. 8 is a plan view illustrating arrangement of an upper elastic member and a first magnet in a lens moving apparatus according to another embodiment.

FIG. 8 is a plan view illustrating arrangement of the upper elastic member 150 and the first magnet 130 in a lens moving apparatus according to another embodiment.

As shown in FIG. 8, the position detection sensor 170 may face the first magnet 130 in the second direction, and also face the fifth upper elastic member 150-5 or the sixth upper elastic member 150-6.

In this structure, vibration caused by tilt in the x-z plane or shift in the second direction of the bobbin 110 or the housing 140 and corresponding resonance may be attenuated by the first and third upper elastic members and the second and fourth upper elastic members 150-4, which are arranged in parallel and have increased elastic modulus, spring constant or rigidity.

Due to this attenuation effect, the position detection sensor 170 may detect the first-direction displacement of the bobbin 110 more accurately.

That is, erroneous sensing of the position detection sensor 170 coupled to the bobbin may occur due to vibration caused by tilt and/or shift of the bobbin 110. Therefore, in order to attenuate erroneous sensing caused by tilt and/or shift of the bobbin 110 of the position detection sensor 170, the elastic modulus in the direction parallel to the direction in which the position detection sensor 170 and the first magnet 130 face each other may be increased over the elastic modulus in the direction perpendicular thereto.

Additionally, since the position detection sensor 170 is movable, reducing the elastic modulus of the part coupled to the position detection sensor 170 in the horizontal direction may increase the elastic modulus of a neighboring part to suppress or alleviate resonance of the bobbin 150 through the upper elastic member 150, thereby weakening the influence of tilt or shift of the bobbin 110 coupled with the position detection sensor 170. In addition, the arrangement of the position detection sensor 170 may be reversed if it ever enhances the design.

As shown in FIG. 8, the fifth upper elastic member 150-5 and the sixth upper elastic member 150-6 may be arranged in a direction perpendicular to the direction in which the position detection sensor 170 and the first magnet 130 face each other, the first to fourth upper elastic members may be arranged in a direction parallel thereto.

With this structure, even if vibration occurs due to tilt and/or shift of the bobbin 110, movement of the position detection sensor 170 may be suppressed by the first to fourth upper elastic members and erroneous sensing may be attenuated, compared to the embodiment shown in FIG. 5.

Figure 9:
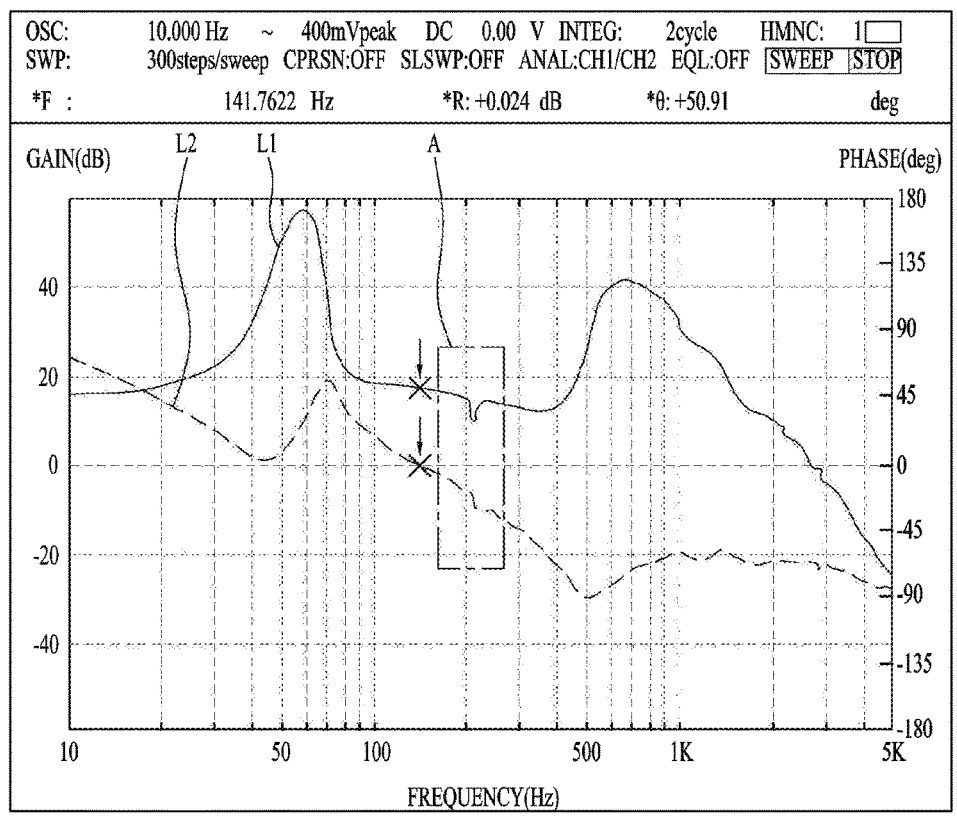
FIG. 9 is a graph showing a result of frequency response analysis of a lens moving apparatus according to an embodiment.
Figure 10:
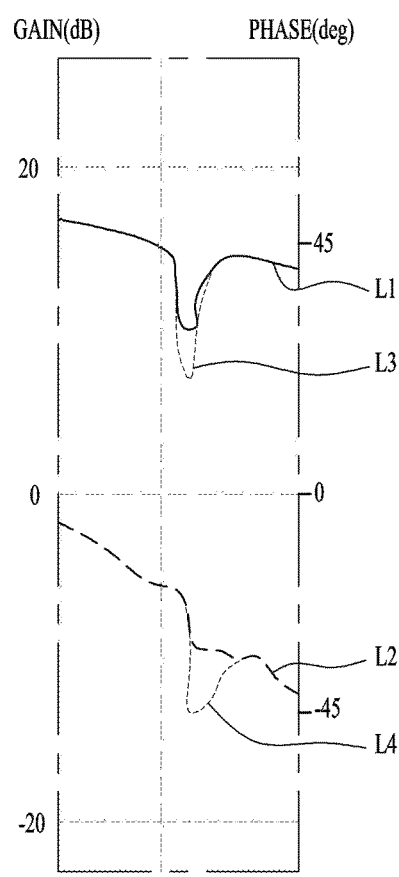
FIG. 10 is a view showing a portion A in FIG. 9.

FIG. 9 is a graph showing a result of frequency response analysis of a lens moving apparatus according to an embodiment. FIG. 10 is a view showing a portion A in FIG. 9. The graph represents the result of frequency response analysis in a case where the lens moving apparatus performs autofocus. The lens moving apparatus exhibits the characteristic of a feedback frequency after PID control of autofocusing.

Frequency response analysis is commonly used as a method for checking stability of a system, such as the lens moving apparatus, against mechanical vibration, and a detailed description thereof will be omitted.

In FIGS. 9 and 10, portion A represents the second-order resonance point. That is, it is a point where resonance is caused by vibration in the second direction or the third direction due to tilt or shift of the housing 140 or the bobbin 110.

In FIG. 9, L1 represents the phase of a frequency related to movement of the bobbin 110 in the first direction in the lens moving apparatus of the embodiment, and L2 represents the gain of the frequency of the bobbin 110.

In frequency response analysis, stability at the second-order resonance point may be determined by the gain and phase. That is, as the change in gain and phase at the second-order resonance point decreases, the magnitude of resonance may be reduced. As the resonance magnitude is reduced, the extent of the tilt and shift vibration of the bobbin 110 caused by resonance may be reduced, and thus autofocus may be performed stably.

The result of frequency response analysis of an embodiment at the second-order resonance point is shown in FIG. 10. In FIG. 10, L3 represents the phase of the frequency at the second-order resonance point when the lens moving apparatus having the upper elastic member which is not divided performs autofocus.

When the curves L1 and L3 are compared, L3 exhibits a more abrupt phase change at the second-order resonance point than L1. Therefore, the embodiment having the upper elastic member 150 divided into 8 parts may reduce the magnitude of resonance at the second-order resonance point and allow autofocus to be stably performed, compared to the case where the upper elastic member is not divided.

In FIG. 10, L4 represents the gain of the frequency at the second-order resonance point when a lens moving apparatus having the upper elastic member which is not divided performs autofocus.

When the curves L2 and L4 are compared, L4 exhibits a more abrupt phase change than L2 at the second-order resonance point. Therefore, as in the case of the phase of the frequency, for the gain result of the frequency, the embodiment having the upper elastic member 150 divided into eight parts may significantly reduce the magnitude of resonance at the second-order resonance point and allow autofocus to be stably performed, compared to the case of having the upper elastic member not divided.

In an embodiment, the upper elastic member 150 may be divided into parts, and some of the divided parts may be arranged in parallel to increase the elastic modulus, spring constant, or rigidity of the upper elastic member 150. Thereby, unnecessary tilt and shift of the bobbin 110 or the housing 140 may be suppressed when the lens moving apparatus operates.

Further, when the lens moving apparatus performs autofocus, tilt and shift of the bobbin 110 or the housing 140 may be suppressed, and resonance caused thereby may be suppressed.

Further, it is easy to secure a gain margin and/or a phase margin for enhancing stability against mechanical resonance.

Meanwhile, the lens moving apparatus according to the above-described embodiments may be used in various fields, for example, a camera module. For example, the camera module may be applied to a mobile device such as a cellular phone.

The camera module according to an embodiment may include a lens barrel coupled to the bobbin 110, an image sensor (not shown), a printed circuit board 250, and an optical system.

The lens barrel is configured as described above, and the printed circuit board 250 may form the bottom surface of the camera module as a part on which the image sensor is mounted.

Further, the optical system may include at least one lens that transmits an image to the image sensor. The optical system may be provided with an actuator module capable of performing the autofocus function and the hand-tremor correction function. The actuator modules that performs the autofocus function may be configured in various ways, and a voice coil unit motor is generally used. The lens moving apparatus according to the embodiment described above may serve as the actuator module performing both the autofocus function and the hand-tremor correction function.

The camera module may further include an infrared blocking filter (not shown). The infrared blocking filter blocks infrared light from being incident on the image sensor. In this case, the infrared blocking filter may be installed at a position corresponding to the image sensor on the base 210 exemplarily shown in FIG. 2, and may be coupled to a holder member (not shown). Further, the base 210 may support the lower side of the holder member.

A separate terminal member may be provided on the base 210 so as to be electrically connected with the printed circuit board 250, or a terminal may be integrally formed using a surface electrode or the like. The base 210 may function as a sensor holder for protecting the image sensor. In this case, a protrusion may be formed downward along a side surface of the base 210. However, this is not essential. Although not shown, a separate sensor holder may be disposed under the base 210 to function as the protrusion.

Figure 11:
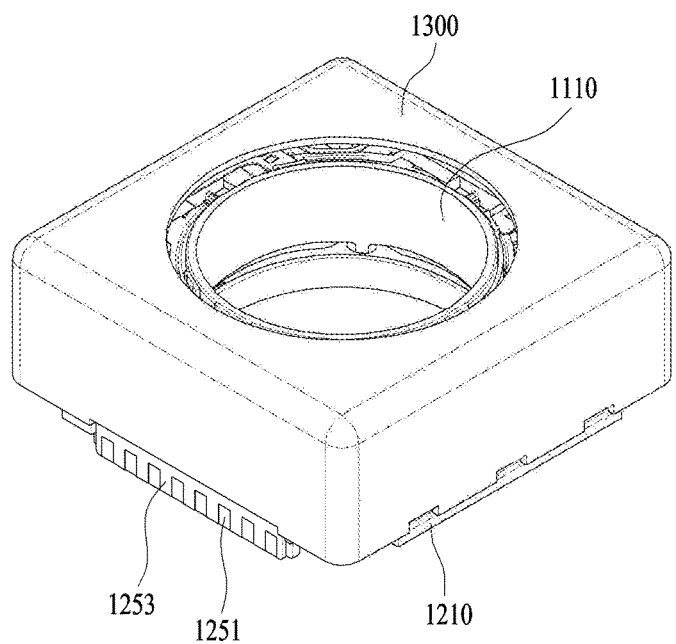
FIG. 11 is a perspective view showing a lens moving apparatus according to another embodiment.
Figure 12:
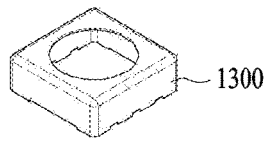
FIG. 12 is an exploded perspective view showing a lens moving apparatus according to another embodiment.
Figure 12:
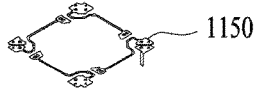
Figure 12:
Figure 12:
Figure 12:
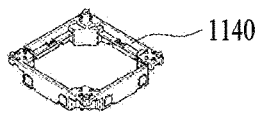
Figure 12:
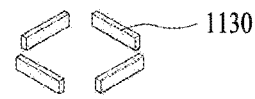
Figure 12:
Figure 12:
Figure 12:
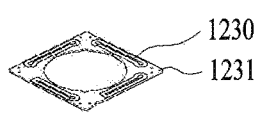
Figure 12:
Figure 12:

FIG. 11 is a perspective view showing a lens moving apparatus according to another embodiment. FIG. 12 is an exploded perspective view showing a lens moving apparatus according to another embodiment.

As shown in FIGS. 11 and 12, the lens moving apparatus according to the embodiment may include a movable unit. The movable unit may perform the functions of autofocusing of the lens and hand-tremor correction. The movable unit may include a bobbin 1110, a first coil 1120, a first magnet 1130, a housing 1140, an upper elastic member 1150, and a lower elastic member 1160.

The bobbin 1110 is arranged inside the housing 1140 and is provided on the outer circumferential surface thereof with the first coil 1120, which is disposed inside the first magnet 130. The bobbin may be installed to reciprocate in the inner space of the housing 1140 in the first direction by electromagnetic interaction between the first magnet 1130 and the first coil 1120. The first coil 1120 may be installed on the outer circumferential surface of the bobbin 1110 so as to electromagnetically interact with the first magnet 1130.

The bobbin 1110 may be resiliently supported by upper and lower elastic members 1150 and 1160 and thus move the first direction to perform the autofocus function.

The bobbin 1110 may include a lens barrel (not shown) in which at least one lens is installed. The lens barrel may be coupled to the inside of the bobbin 1110 in various ways.

For example, female threads may be formed on the inner circumferential surface of the bobbin 1110, male threads corresponding to the female threads may be formed on the outer circumferential surface of the lens barrel, and the lens barrel may be screwed onto the bobbin 1110. However, embodiments are not limited thereto, and the lens barrel may be directly fixed to the inside of the bobbin 1110 by a method other than screw-coupling, without forming threads on the inner circumferential surface of the bobbin 1110. Alternatively, the one or more lenses may be integrated with the bobbin 1110 without a lens barrel.

The lens coupled to the lens barrel may be composed of a single lens, or two or more lenses may be configured to construct an optical system.

The autofocus function may be controlled according to the direction of the current, and be implemented by moving the bobbin 1110 in the first direction. For example, the bobbin 1110 may move upward from the initial position when the forward current is applied, and may move downward from the initial position when the reverse current is applied. Alternatively, the amount of the current in one direction may be adjusted to increase or decrease the distance of movement from the initial position in one direction.

The upper and lower surfaces of the bobbin 1110 may have a plurality of upper support protrusions and a plurality of lower support protrusions. The upper support protrusions may be formed in a cylindrical shape or a prismatic shape, and coupled and fixed to the upper elastic member 1150. The lower support protrusions may be formed in a cylindrical shape or a prismatic shape like the upper support protrusions, and coupled and fixed to the lower elastic member 1160.

Here, the upper elastic member 1150 may have through holes corresponding to the upper support protrusions, and the lower elastic member 1160 may have through holes corresponding to the lower support protrusions. The respective support protrusions and the through holes may be fixedly connected by thermal bonding or an adhesive such as epoxy.

The housing 1140 has a hollow column shape for supporting the first magnet 1130, and may be approximately rectangular in shape. The first magnet 1130 and support members 1220 may be coupled to the lateral surface of the housing 1140. As described above, the bobbin 1110, which is guided by the elastic members 1150 and 1160 to move in the first direction, may be disposed inside the housing 1140.

The upper elastic member 1150 and the lower elastic member 1160 may be coupled to the housing 1140 and the bobbin 1110. The upper elastic member 1150 and the lower elastic member 1160 may elastically support the ascending and/or descending movement of the bobbin 1110 in the direction of the arrow. The upper elastic member 1150 and the lower elastic member 1160 may be formed as leaf springs.

As shown in FIG. 12, the upper elastic member 1150 may include a plurality of parts separated from each other. With this multi-divisional structure, the divided parts of the upper elastic member 1150 may be supplied with electric currents of different polarities or different powers. The lower elastic member 1160 may also have a multi-divisional structure and be electrically connected to the upper elastic member 1150.

The upper elastic member 1150, the lower elastic member 1160, the bobbin 1110, and the housing 1140 may be assembled through thermal bonding and/or bonding using an adhesive or the like.

A base 1210 may be disposed under the bobbin 1110 and be approximately rectangular in shape, and a printed circuit board 1250 may be disposed or seated thereon.

A support groove having a size corresponding to a part of the printed circuit board 1250 provided with a terminal surface 1253 may be formed on a surface of the base 1210 facing the part of the printed circuit board 1250. The support groove may be recessed to a certain depth from the outer circumferential surface of the base 1210 such that the part provided with the terminal surface 1253 may not protrude outward or the degree of protruding may be adjusted.

A support member 1220 may be disposed on the lateral surface of the housing 1140 so as to be spaced apart from the housing 1140 and have an upper side coupled to the upper elastic member 1150 and a lower side connected to the base 1210, the printed circuit board 1250, or a circuit member 1231. The support member may support the bobbin 1110 and the housing 1140 such that the bobbin 1110 and the housing 1140 may be moved in the second direction and/or the third direction perpendicular to the first direction, and may be electrically connected to the first coil 1120.

Since the support members 1220 according to an embodiment are disposed on the outer surface of the corners of the housing 1140, at least four support members 1220 may be symmetrically provided. As shown in FIG. 12, when each pair of support members 1220 is disposed on the outer surface of each corner of the housing 1140, all eight support members 1220 may be symmetrically provided.

The support members 1220 may be electrically connected to the upper elastic member 1150. That is, for example, the support members 1220 may be electrically connected to a portion of the upper elastic member 1150 where the through holes are formed.

Since the support members 1220 are formed separately from the upper elastic member 1150, the support member 1220 and the upper elastic member 1150 may be electrically connected through a conductive adhesive, soldering, or the like. Accordingly, the upper elastic member 1150 may apply electric current to the first coil 1120 through the electrically connected support member 1220.

The support members 1220 may be connected to the printed circuit board 1250 through the through holes formed in the circuit member 1231 and the printed circuit board 1250. Alternatively, the through holes may not be formed in the circuit member 1231 and/or the printed circuit board 1250, and the support members 1220 may be electrically soldered to a corresponding portion of the circuit member 1231.

In FIG. 12, linear support members 1220 are shown as one embodiment, but embodiments are not limited thereto. That is, the support members 1220 may be provided in the form of a plate member or the like.

The second coil 1230 may move the housing 1140 in the second and/or third directions through electromagnetic interaction with the first magnet 1130 to perform hand-tremor correction.

Here, the second and third directions may include directions substantially close to the x-axis (or the first direction) and the y-axis (or the second direction), as well as the x-axis and y-axis directions. That is, in terms of driving in the embodiment, the housing 1140 may move parallel to the x-axis and y-axis, or may be slightly inclined with respect to the x-axis and y-axis when moved while being supported by the support members 1220.

Therefore, the first magnet 1130 needs to be installed at a position corresponding to the second coil 1230.

The second coil 1230 may be disposed to face the first magnet 1130 fixed to the housing 1140. In an embodiment, the second coil 1230 may be disposed outside the first magnet 1130. Alternatively, the second coil 1230 may be disposed on the lower side of the first magnet 1130 and spaced apart therefrom by a predetermined distance.

According to the embodiment, a total of four second coils 1230 may be provided on four side portions of the circuit member 1231, but embodiments are not limited thereto. For example, only two coils, one coil for the second direction and the other coil for the third direction, may be provided, or four or more coils may be provided.

Alternatively, six second coils may be disposed such that one coil for the second direction is disposed on a first side, two coils for the second direction are disposed on a second side, one coil for the third direction is disposed on a third side, and two coils for the third direction are disposed on a fourth side. Alternatively, in this case, the first side and the fourth side may be adjacent to each other, and the second side and the third side may be adjacent to each other.

In an embodiment, a circuit pattern in the shape of the second coil 1230 may be formed on the circuit member 1231, or a separate second coil may be disposed on the circuit member 1231. However, embodiments are not limited thereto, and a circuit pattern in the shape of the second coil 1230 may be formed directly on the member 1231.

Alternatively, the second coil 1230 may be formed by winding a wire in a toroidal shape or configured in the form of an FP coil and electrically connected to the printed circuit board 1250.

The circuit member 1231 including the second coil 1230 may be installed or disposed on the upper surface of the printed circuit board 1250 disposed on the upper side of the base 1210. However, embodiments are not limited thereto. The second coil 1230 may be disposed in close contact with the base 1210, may be spaced apart therefrom, or may be formed on a separate substrate, which is stacked on and connected to the printed circuit board 1250.

The printed circuit board 1250 may be electrically connected to at least one of the upper elastic member 1150 and the lower elastic member 160 and be coupled to the upper surface of the base 1210, and, as shown in FIG. 12, may be provided with through holes at positions corresponding to the ends of the support members 1220. Alternatively, it may be electrically connected and/or bonded to the support members without the through holes provided.

A terminal 1251 may be disposed or formed on the printed circuit board 1250. The terminal 1251 may be disposed on the bent terminal surface 1253. A plurality of terminals 1251 may be disposed on the terminal surface 1253 to receive external power to supply current to the first coil 1120 and/or the second coil 1230. The number of terminals formed on the terminal surface 1253 may be increased or decreased depending on the type of components that need to be controlled. In addition, the printed circuit board 1250 may have one or more terminal surfaces 1253.

The cover member 1300 may be approximately formed in a box shape and may accommodate the moving unit, the second coil 1230, a portion of the printed circuit board 1250, and the like, and may be coupled to the base 1210. The cover member 1300 may protect the movable unit, the second coil 1230, the printed circuit board 1250 and the like accommodated therein from being damaged and further restricts leakage of an electromagnetic field generated by the first magnet 1130, the first coil 1120, the second coil 1230, and the like such that the electromagnetic field may be focused.

Figure 13:
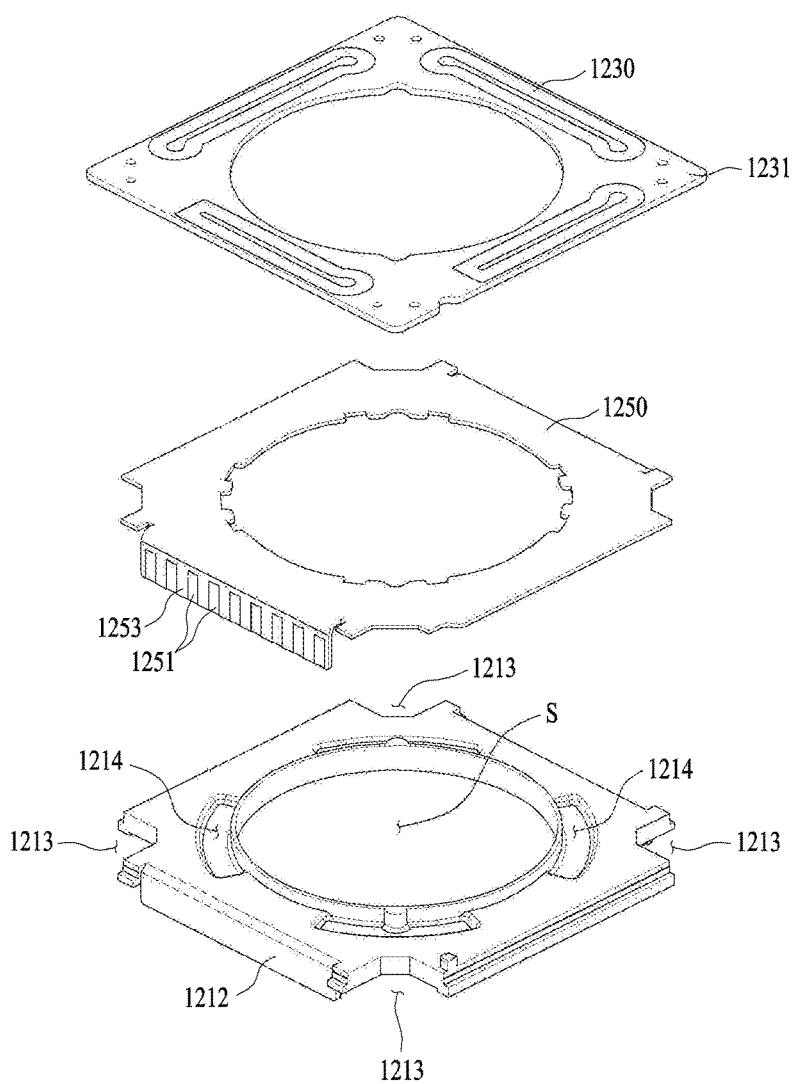
FIG. 13 is an exploded perspective view showing a portion of a lens moving apparatus according to another embodiment.
Figure 14:
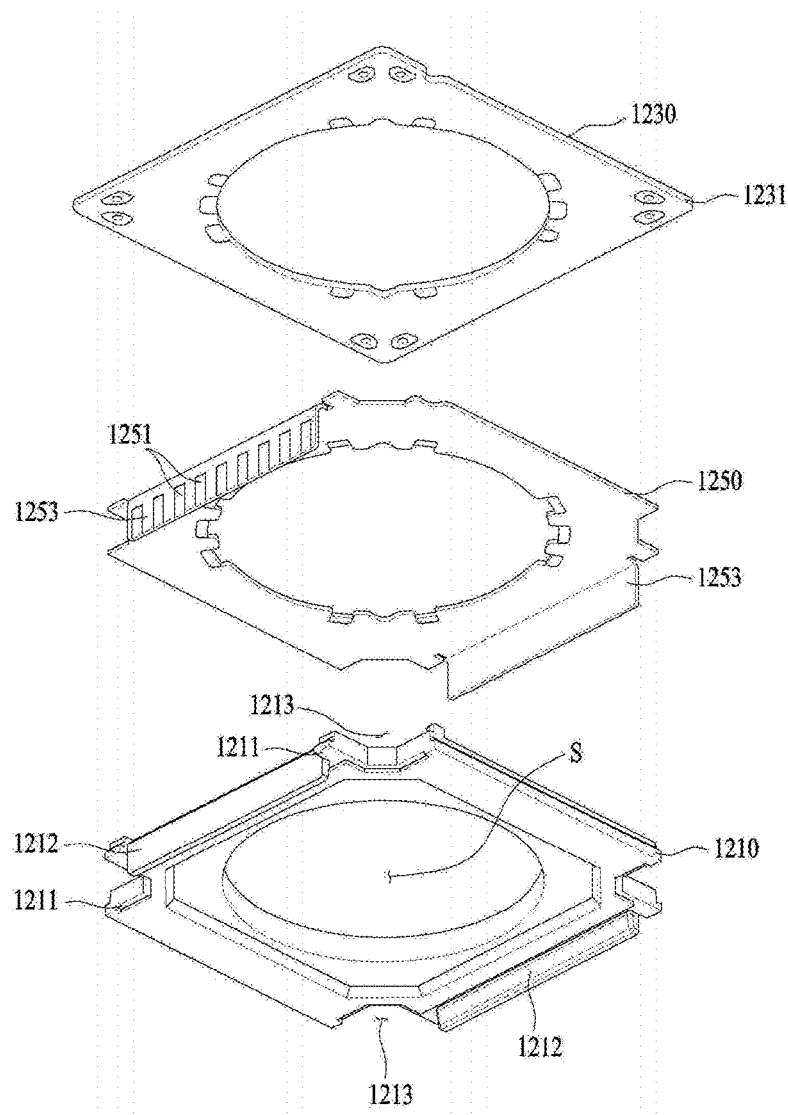
FIG. 14 is a bottom perspective view of FIG. 13.
Figure 15:
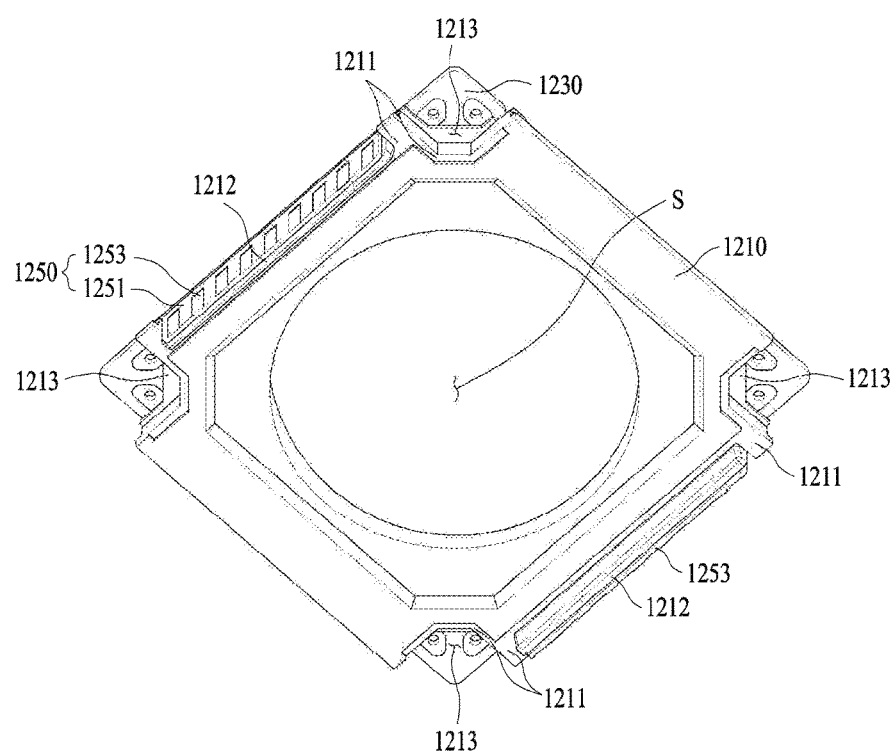
FIG. 15 is a bottom perspective view showing a portion of a lens moving apparatus according to another embodiment.
Figure 16:
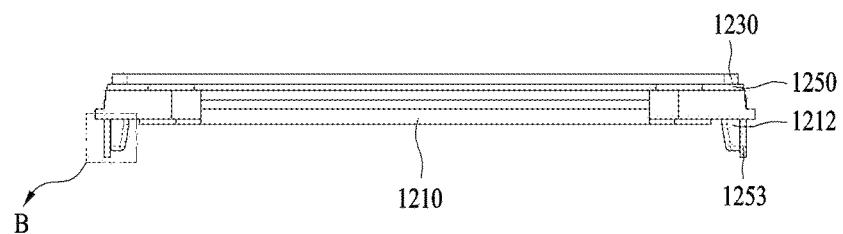
FIG. 16 is a side view of FIG. 15.
Figure 17:
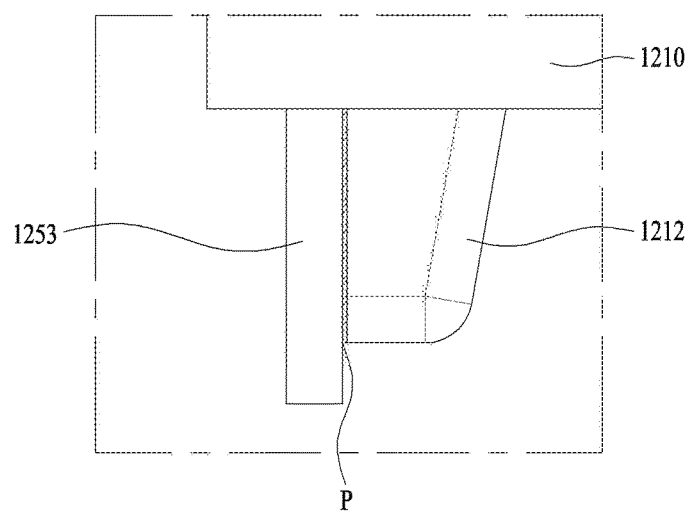
FIG. 17 is an enlarged view of a portion B in FIG. 16.

FIG. 13 is an exploded perspective view showing a portion of a lens moving apparatus according to another embodiment. FIG. 14 is a bottom perspective view of FIG. 13. FIG. 15 is a bottom perspective view showing a portion of a lens moving apparatus according to another embodiment. FIG. 16 is a side view of FIG. 15. FIG. 17 is an enlarged view of a portion B in FIG. 16.

In an embodiment, the circuit member 1231 provided with the second coil 1230 may be coupled or fixed to the printed circuit board 1250 by an adhesive or soldering, and may be electrically connected to the printed circuit board 1250 to receive a current from the printed circuit board 1250.

The second coil 1230 may be supplied with current from the printed circuit board 1250 and move the housing 1140 in the second direction and/or the third direction through electromagnetic interaction with the first magnet 1130 to perform hand-tremor correction of the lens moving apparatus.

The printed circuit board 1250 may be bonded or fixed to the base 1210, which is bonded, for example, by an adhesive and disposed on the lower side. Here, the adhesive may be applied to the lower surface of the printed circuit board 1250 and the inner surface of the terminal surface 1253.

As shown in FIGS. 13 and 14, the terminal surface 1253 may be formed on one side of the printed circuit board 1250 so as to be bent, and the number of the terminal surfaces 1253 may be one to four in the embodiment. In one embodiment, in the case where the printed circuit board 1250 is formed of a flexible material, when the terminal surface 1253 is integrally formed on the printed circuit board 1250 and adhered to the base 1210, the terminal surface 1253 may be bent and bonded to a corresponding portion of the base 1210.

The adhesive may be applied to a portion of the base 1210 corresponding to the lower surface of the printed circuit board 1250 and the inner surface of the terminal surface 1253. Of course, in bonding the printed board and the base 1210, the adhesive may be applied to only one of the base 1210 and the printed circuit board 1250, or may be applied to both the base 1210 and the printed circuit board 1250.

The base 1210 may be provided with a bent portion 1212 corresponding to the inner surface of the terminal surface 1253 of the printed circuit board 1250 so as to be bonded to the inner surface. That is, the bent portion 1212 may be formed at a portion of the base 1210 corresponding to the terminal surface 1253 and bonded to the terminal surface 1253.

Specifically, as shown in FIG. 17, the inner surface of the terminal surface 1253 and the outer surface of the bent portion 1212 may be arranged to face each other, adhering portions P may be formed therebetween, and the terminal surface 1253 and the bent portion 1212 may be bonded to each other with an adhesive interposed between the adhering portions P.

As described above, a plurality of terminal surfaces 1253 may be provided on the printed circuit board 1250, and accordingly as many bent portions 1212 as the number of the terminal surfaces 1253 may be provided at the positions corresponding to the terminal surfaces.

As shown in FIGS. 13 and 14, the printed circuit board 1250 may have, for example, a quadrangular outer shape when viewed in the first direction, and the terminal surfaces 1253 may be bent from one side of the printed circuit board 1250.

Accordingly, the base 1210 is formed to have a quadrangular outer shape corresponding to the terminal surface 1253 when viewed in the first direction, and the bent portion 1212 may extend from the side of the base 1210 and be bent.

An escape 1213 may be formed in the base 1210 and a corner of the base 1210 may be embedded in the escape 1213. In an embodiment, since the escape 1213 is formed at each corner of the base 1210, a total of four escapes 1213 may be formed in the base 1210.

The escape 1213 may be spaced apart from the front end and rear end of the bent portion 1212 arranged in the longitudinal direction and a portion where the escape 1213 and the bent portion 1212 are spaced apart from each other may be provided with a first recessed portion 1211.

The escape 1213 may be formed to check soldering of the support members 1220 to the circuit member 1231 and/or the printed circuit board 1250. Particularly, in the case where a through hole is formed in the circuit member 1231 and the printed circuit board 1250 and the lower ends of the support members 1220 are inserted into the through hole, when soldering is applied to a portion of the lower surface of the printed circuit board 1250 through which the support members 1220 are inserted, it may be to determine whether or not the soldering is defective by observing the soldering condition.

As described in detail below, the first recessed portion 1211 may be formed to surround, for example, at least a portion of the escape 1213.

On the other hand, if a through hole is not formed in the circuit member 1231 and/or the printed circuit board 1250 and the support members 1220 are electrically soldered to a corresponding portion of the circuit member 1231, the escape 1213 may not be formed.

If the escape 1213 is not formed, the first recessed portion 1211 may be formed at, for example, a corner of the base 1210 on the lower surface of the base 1210.

If the adhesive is insufficiently applied to the adhering portions P of the base 1210 and the printed circuit board 1250, a gap may be produced between the base 1210 and the printed circuit board 1250.

Particularly, if the adhesive is insufficiently applied between the terminal surface 1253 and the bent portion 1212, a gap may be produced between the terminal surface 1253 and the bent portion 1212. Due to the gap, the terminal surface 1253 may be spaced away from the bent portion 1212 and placed at an undesired position. This may lead to bad assembly and product defects.

Therefore, it is appropriate that the adhesive is sufficiently applied to the adhering portions P of the base 1210 and the printed circuit board 1250. On the other hand, if the adhesive is excessively applied to the adhering portions P, the following issues may be raised.

If the adhesive is excessively applied to the adhering portions P, the excess adhesive may flow to the lower side of the base 1210 and be cured on the lower side. The adhesive that has flowed to the lower side of the base 1210 and cured may form a protrusion.

Thereby, a filter (not shown) disposed below the base 1210 and capable of being coupled with the base 1210, a holder (not shown) on which the filter is mounted, etc. may not be bonded as designed due to the protrusion, a gap may be formed between the adhering portions P, and the camera module including the lens moving apparatus may have locally different heights.

Such difference in height may lead to defects of the lens moving apparatus and the camera module. Even when the adhesive is sufficiently applied to the adhering portions P, defects may be produced due to the difference in height. Therefore, a structure capable of inhibiting the defects may be formed on the base 1210.

To this end, in an embodiment, the lower surface of the base 1210 may be provided with a first recessed portion 1211 and the upper surface of the base 1210 may be provided with a second recessed portion 1214. The first recessed portion 1211 and the second recessed portion 1214 will be described in detail below.

The first recessed portion 1211 may be formed on a portion of the lower surface of the base 1210 to which the terminal surface 1253 of the printed circuit board 1250 is bonded. The first recessed portion 1211 may serve to accommodate the excess adhesive to suppress formation of the protrusion, which is generated by curing of the adhesive introduced into the lower surface of the base 1210.

Particularly, the first recessed portion 1211 is preferably formed around the bent portion 1212 since it serves to inhibit the adhesive applied to the lower surface of the printed circuit board 1250 and/or the upper surface of the base 1210 and the adhesive applied to the terminal surface 1253 and/or the bent portion 1212 from flowing to the lower surface of the base 1210 and form a protrusion on the lower surface of the base 1210.

Since the adhesive has surface tension in the liquid state, the flow path of the adhesive flowing out of the terminal surface 1253 and/or the bent portion 1212 may be changed at the lower end of the side surface of the base 1210 by the surface tension, and thus the adhesive may flow to the lower side of the base 1210 and the first recessed portion 1211 may receive the introduced adhesive.

As shown in FIGS. 14 and 15, since the first recessed portion 1211 is recessed in the lower surface of the base 1210, even if the adhesive introduced into the first recessed portion 1211 is cured, it does not form a protrusion on the lower surface of the base 1210. Therefore, the lower surface of the base 1210 may maintain flatness.

Accordingly, the first recessed portion 1211 may inhibit or reduce product defects of the lens moving apparatus and the camera module caused by protrusions formed by the adhesive. The specific structure of the first recessed portion 1211 will be described below with reference to FIGS. 19 and 20.

Figure 18:
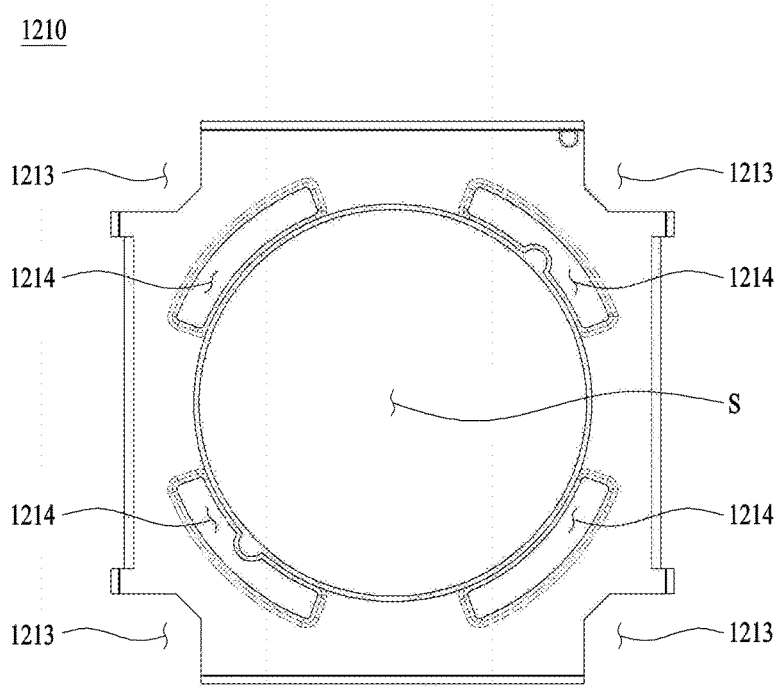
FIG. 18 is a plan view of a base according to an embodiment.

FIG. 18 is a plan view of a base 1210 according to an embodiment. As shown in FIG. 18, the base 1210 may have a second recessed portion 1214 on the upper surface thereof.

The second recessed portion 1214 is a portion into which an excess of an adhesive for bonding the printed circuit board 1250 and the base 1210 is introduced. Thus, it may accommodate the excess portion of the adhesive applied to the lower surface of the printed circuit board 1250 and/or the upper surface of the base 1210.

Accordingly, the second recessed portion 1214 may reduce the local difference in height of the printed circuit board 1250 over the base 1210 in the first direction caused by the excess adhesive. In addition, defects in the lens moving apparatus and the camera module due to such height difference may be reduced.

Also, the excess adhesive may be inhibited from flowing out of the base 1210 and the printed circuit board 1250 to be cured to form a protrusion, and thus product defects caused by such protrusion may be reduced.

In addition, flow of the excess adhesive along the bent portion 1212 and/or the terminal surface 1253 to the lower surface of the base 1210 may be reduced. The excess adhesive may flow down along the outer side of the terminal surface 1253 and may be applied to the terminal 1251 formed on the terminal surface 1253 and cured to reduce product defects.

As shown in FIG. 18, the base 1210 may be provided with a circular hollow S, and the second recessed portion 1214 may be formed along, for example, the circumferential surface of the hollow S.

In addition, as shown in FIG. 18, a plurality of second recessed portions 1214 may be provided, and the respective second recessed portions 1214 may be disposed at regular intervals along the circumferential surface of the hollow S. Although not shown, the second recessed portion 1214 may be formed in a donut shape surrounding the hollow S.

In addition, although not shown, the second recessed portion 1214 may be formed at various positions on the upper surface of the base 1210 and in various shapes. For example, the second recessed portion 1214 may be formed along each side of the upper surface of the base 1210.

In addition, if the escape 1213 is not formed on the base 1210, the recessed portion may be formed at a corner of the base 1210. In addition, when viewed in the first direction, the second recessed portion 1214 may be formed in various shapes such as a closed loop, a polygon, a circular shape and the like.

Figure 19:
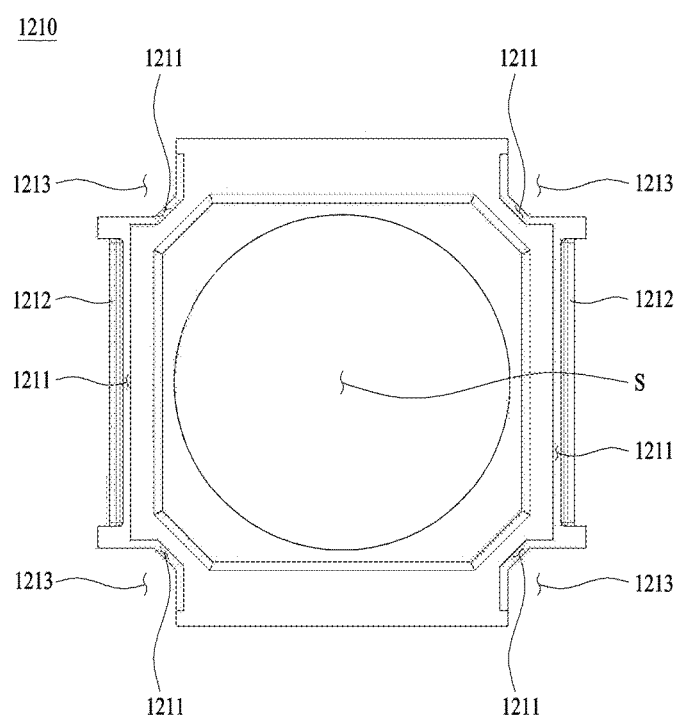
FIG. 19 is a bottom view of a base according to one embodiment.

FIG. 19 is a bottom view of a base according to one embodiment. As shown in FIG. 19, the first recessed portion 1211 may be formed to surround at least a part of the bent portion 1212. Since the excess adhesive may flow, by surface tension, to the lower surface of the base 1210 from a point where the bent portion 1212 starts, it may be proper to form the first recessed portion to surround a part of the bent portion 1212.

Specifically, for example, the first recessed portion 1211 may be formed to surround at least a portion of the front end and the rear end of the bent portion 1212. Since the excess adhesive mainly flows to the lower surface of the base 1210 from the points of the front and rear ends where the bent portion 1212 starts, forming the first recessed portion 1211 may be appropriate.

In addition, for example, a part of the first recessed portion 1211 may be formed in the longitudinal direction of the bent portion 1212, and the other part thereof may be formed along the escape 1213. Here, the first recessed portion 1211 may be formed to surround at least a portion of the escape 1213.

The first recessed portion 1211 having the structure as above may provide a sufficient space to accommodate the excess adhesive introduced into the first recessed portion 1211 from the points of the front and rear ends of the bent portion 1212 where the bent portion 1212 starts.

That is, a portion of the adhesive flowing to the lower surface of the base 1210 may be introduced into the first recessed portion 1211 formed along the escape 1213, and the rest of the adhesive may be introduced into the first recessed portion 1211 formed in the longitudinal direction of the bent portion 1212.

The adhesive may flow along the first recessed portion 1211 due to surface tension and be cured. Thereby, the protrusion may not be formed on the lower surface of the base 1210, and flatness of a portion of the lower surface of the base 1210 bonded to other components such as the holder may be maintained.

Figure 20:
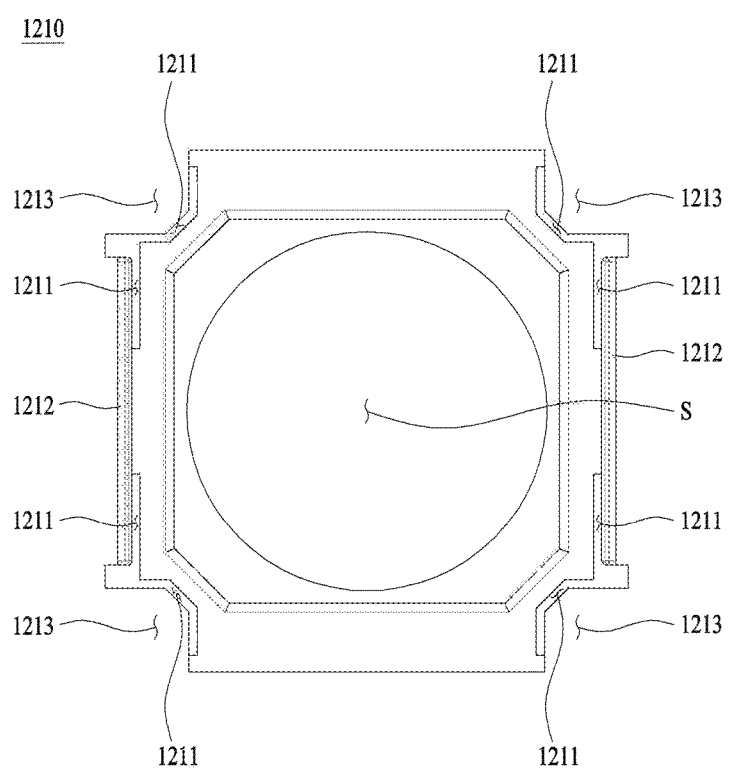
FIG. 20 is a bottom view of a base according to another embodiment.

FIG. 20 is a bottom view of a base according to another embodiment. As shown in FIG. 20, a plurality of first recessed portions 1211 may be discontinuously performed in the longitudinal direction of the bent portion 1212 to surround the front end and rear ends of the bent portion 1212.

That is, the first recessed portions 1211 may not be formed at the center of the bent portion 1212 but may be formed so as to surround the front and rear ends of the bent portion 1212. This structure may inhibit the bent portion 1212 from being bent.

In other words, if the thickness of a portion of the base 1210 where the bent portion 1212 is formed is reduced due to formation of the first recessed portion 1211, the bent portion 1212 may be laterally bent, or deflected.

Therefore, if the first recessed portion 1211 is formed only at the front and rear ends of the bent portion 1212, the central portion may firmly fix the bent portion 1212, and accordingly lateral bending of the bent portion 1212 may be inhibited or reduced.

The first recessed portions 1211 may be provided in various shapes and numbers and formed at various positions on the lower surface of the base 1210. However, as shown in FIGS. 19 and 20, the first recessed portion 1211 is preferably provided to surround the front and rear ends of the bent portion 1212.

This is because the adhesive introduced into the lower surface of the base 1210 from the terminal surface 1253 and the bent portion 1212 may mainly flow to the lower surface of the base 1210 from the points of the front and rear ends of the bent portion 1212 where the bent portion 1212 protrudes, as described above.

In order to facilitate formation, the first recessed portion 1211 may be closed at one side and the opposite side may be open when viewed in the second or third direction, and the open opposite side may be formed to end on the side surface of the base 1210.

Although not shown, the first recessed portion 1211 may be provided with a stepped portion to more securely inhibit the adhesive from flowing to the lower surface of the base 1210.

With this stepped portion, even when the adhesive flows over the first stage of the first recessed portion 1211, the adhesive may be blocked from flowing onto the adhering portion of the lower surface of the base 1210 by the second stage. Of course, the stepped portion may be provided with three or more stages.

In an embodiment, since the excess adhesive may be accommodated in the first recessed portion 1211 provided on the lower side of the base 1210, the adhesive may be inhibited from forming a protrusion on the lower surface of the base 1210.

In addition, since the excess adhesive may be accommodated in the second recessed portion 1214 provided on the upper side of the base 1210, the adhesive may be inhibited from forming a protrusion on the upper surface of the base 1210.

In addition, since flatness of the adhering portions with respect to the other components on the lower surface of the base 1210 may be maintained by suppressing formation of the protrusion, the difference in height may be eliminated or reduced in assembling the lens moving apparatus and the camera module.

Further, by reducing or eliminating the height difference, defects may be eliminated or reduced in assembling the lens moving apparatus and the camera module.

While only a few have been described above in connection with the embodiments, various other forms of implementation are possible. The technical contents of the embodiments described above may be combined in various forms other than the mutually incompatible technologies, thereby implementing a new embodiment.

INDUSTRIAL APPLICABILITY

In embodiments, the upper elastic member may be divided into parts, and some of the divided parts may be arranged in parallel to increase the elastic modulus, spring constant, or rigidity of the upper elastic member, thereby suppressing unnecessary tilt and shift of the bobbin or the housing in operation of the lens moving apparatus. Therefore, there is industrial applicability.

The invention claimed is:

1. A lens moving apparatus comprising:
 a housing;
 a bobbin disposed in the housing;
 a first coil disposed on the bobbin;
 a magnet disposed on the housing;
 an upper elastic member coupled to an upper portion of the bobbin and an upper portion of the housing;
 a circuit member disposed under the housing and comprising a second coil opposite to the magnet in a first direction that is parallel with an optical axis direction;
 a printed circuit board disposed under the circuit member;
 a base disposed under the printed circuit board; and
 a support member connecting the upper elastic member to the printed circuit board or the circuit member,
 wherein the upper elastic member comprises a plurality of elastic members, wherein at least two of the plurality of elastic members are disposed in parallel with each other in an x-y plane in a second direction perpendicular to the first direction or in a third direction perpendicular to the first and second directions, and wherein the at least two of the plurality of elastic members form symmetry with respect to a center of the bobbin in the x-y plane.

2. The lens moving apparatus according to claim 1, wherein the at least two of the plurality of elastic members overlap each other when the at least two of the plurality of elastic members are rotated 180 degrees with respect to the center of the bobbin in the x-y plane.

3. The lens moving apparatus according to claim 1, wherein the elastic member comprises:
- a first elastic member and a second elastic member disposed in parallel with each other in the x-y plane in the second direction; and
- a third elastic member and a fourth elastic member disposed in parallel with each other in the x-y plane in the third direction.

4. The lens moving apparatus according to claim 3, wherein the elastic member comprises a fifth elastic member and a sixth elastic member disposed in parallel with each other in the x-y plane in the second direction.

5. The lens moving apparatus according to claim 3, wherein the first and second elastic members are in symmetry with respect to the center of the bobbin in the x-y plane.

6. The lens moving apparatus according to claim 3, wherein the third and fourth elastic members are in symmetry with respect to the center of the bobbin in the x-y plane.

7. The lens moving apparatus according to claim 4, wherein the support member comprises first to fourth support members corresponding to the first to fourth elastic members, and the first to fourth support members are electrically connected to the printed circuit board, and
- wherein one end of each of the first to fourth support members is coupled to a corresponding one of the first to fourth elastic members.

8. The lens moving apparatus according to claim 7, wherein the first coil is electrically connected to the first and second elastic members.

9. The lens moving apparatus according to claim 8, comprising a position detection sensor disposed on the bobbin,
- wherein the support member comprises a fifth support member electrically connected to the fifth elastic member and a sixth support member electrically connected to the sixth elastic member, and
- wherein the position detection sensor is electrically connected to the third to sixth elastic members.

10. The lens moving apparatus according to claim 1, wherein the bobbin is configured to be moved in the first direction by electromagnetic interaction between the first coil and the magnet, and
- wherein the housing is configured to be moved in the second or third direction through electromagnetic interaction between the second coil and the magnet.

11. A lens moving apparatus comprising:
a housing;
a bobbin disposed in the housing;
a first coil disposed on the bobbin;
a magnet disposed on the housing;
a second coil disposed to be opposite to the magnet in a first direction parallel with an optical axis direction;
a printed circuit board disposed under the second coil and comprising a terminal surface and a plurality of terminals formed in the terminal surface; and
a base disposed under the printed circuit board and comprising a bent portion corresponding to the terminal surface of the printed circuit board,
wherein the terminal surface is bent from a side surface of the printed circuit board and is bonded to the bent portion of the base by an adhesive,
wherein a first recessed portion is formed on a portion of a lower surface of the base to which the terminal surface of the printed circuit board is bonded.

12. The lens moving apparatus according to claim 11, wherein the first recessed portion surrounds at least a part of the bent portion of the base.

13. The lens moving apparatus according to claim 11, wherein the base has a quadrangular outer shape when viewed in the first direction and the bent portion of the base is bent by extending from a side of the base.

14. The lens moving apparatus according to claim 13, wherein the base comprises an escape disposed at a corner of the base, and the escape is spaced apart from a front end and a rear end of the bent portion of the base.

15. The lens moving apparatus according to claim 14, wherein the first recessed portion surrounds at least a part of the front end and rear end of the bent portion.

16. The lens moving apparatus according to claim 11, wherein a second recessed portion is formed on an upper surface of the base and wherein an excess of the adhesive is introduced into the second recessed portion.

17. The lens moving apparatus according to claim 16, wherein the base comprises a hollow, and the second recessed portion is formed along a circumferential surface of the hollow.

18. The lens moving apparatus according to claim 17, wherein the second recessed portion comprises a plurality of second recessed portions spaced apart from each other, and
- wherein the second recessed portions are disposed along the circumferential surface of the hollow.

19. The lens moving apparatus according to claim 11, comprising:
- an upper elastic member coupled to the bobbin and the housing; and
- a support member electrically connected to the upper elastic member and the printed circuit board.

20. A camera module comprising:
a lens; and
the lens moving apparatus for moving the lens according to claim 1.

* * * * *